United States Patent
Negami et al.

(10) Patent No.: US 10,309,334 B2
(45) Date of Patent: Jun. 4, 2019

(54) CONTROL DEVICE OF INTERNAL COMBUSTION ENGINE

(71) Applicant: TOYOTA JIDOSHA KABUSHIKI KAISHA, Toyota-shi, Aichi-ken (JP)

(72) Inventors: Akihiko Negami, Gotemba (JP); Naoyoshi Matsubara, Susono (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 15/860,862

(22) Filed: Jan. 3, 2018

(65) Prior Publication Data
US 2018/0195457 A1 Jul. 12, 2018

(30) Foreign Application Priority Data
Jan. 12, 2017 (JP) ................................. 2017-003535

(51) Int. Cl.
*F02D 41/30* (2006.01)
*F02D 41/40* (2006.01)
(Continued)

(52) U.S. Cl.
CPC ......... *F02D 41/3041* (2013.01); *F02D 35/02* (2013.01); *F02D 41/3035* (2013.01);
(Continued)

(58) Field of Classification Search
CPC ........ F02D 35/02; F02D 35/024; F02D 41/14; F02D 41/1458; F02D 41/30;
(Continued)

(56) References Cited

U.S. PATENT DOCUMENTS 7,325,529 B2 * 2/2008 Ancimer ............. F02B 23/0675
123/299
2003/0079716 A1 * 5/2003 Miura ................... F02D 35/028
123/299
(Continued)

FOREIGN PATENT DOCUMENTS

| JP | 2009-209943 | 9/2009 |
|---|---|---|
| JP | 2012-41892 | 3/2012 |
| JP | 2012-41896 | 3/2012 |

*Primary Examiner* — Hung Q Nguyen
*Assistant Examiner* — Johnny H Hoang
(74) *Attorney, Agent, or Firm* — Finnegan, Henderson, Farabow, Garrett & Dunner, LLP

(57) ABSTRACT

The control device controls an internal combustion engine comprising a fuel injector 31. The control device comprises an injection control part controlling fuel injection from the fuel injector. The injection control part controls the fuel injections so as to perform a plurality of pre-injections and a main injection and so that the pre-injected fuel is burned by compression self-ignition after the start of main injection. The injection control part controls the fuel injector so as to perform the pre-injections and main injection at basic injection timings during steady operation, and performs correction control so as to correct the injection timings from the basic injection timings during transient operation. In correction control, the larger a crank angle from TDC of the injection timings of the different injections before correction, the greater the amounts of correction of the injection timings of the injections.

8 Claims, 19 Drawing Sheets

(51) Int. Cl.
*F02D 35/02* (2006.01)
*F02D 41/38* (2006.01)
*F02D 41/14* (2006.01)

(52) U.S. Cl.
CPC ....... *F02D 41/3064* (2013.01); *F02D 41/401* (2013.01); *F02D 41/402* (2013.01); *F02D 41/403* (2013.01); *F02D 35/024* (2013.01); *F02D 35/026* (2013.01); *F02D 35/028* (2013.01); *F02D 41/1458* (2013.01); *F02D 2041/1433* (2013.01); *F02D 2041/389* (2013.01); *F02D 2200/0406* (2013.01); *F02D 2200/0416* (2013.01); *F02D 2200/0614* (2013.01); *F02D 2200/101* (2013.01); *Y02T 10/44* (2013.01)

(58) Field of Classification Search
CPC .. F02D 41/3041; F02D 41/3064; F02D 41/40; F02D 41/401–403

USPC ................. 123/295–300, 305, 435, 500–504
See application file for complete search history.

(56) References Cited

U.S. PATENT DOCUMENTS

| | | |
|---|---|---|
| 2005/0274352 A1 | 12/2005 | Canale et al. |
| 2009/0118986 A1* | 5/2009 | Kita ........................ F02D 37/02 701/105 |
| 2011/0180039 A1* | 7/2011 | Nada ...................... F02D 35/02 123/445 |
| 2012/0323468 A1* | 12/2012 | Miyaura ................. F02D 41/40 701/105 |
| 2015/0090217 A1* | 4/2015 | Kuzuyama .......... F02D 41/1497 123/299 |
| 2015/0219026 A1* | 8/2015 | Urano .................. F02D 35/023 123/48 B |

\* cited by examiner

FIG. 5A $$\begin{array}{l} TijM_{11}\ TijM_{12}\ \cdots\ \cdots\ \cdots\ TijM_{1n} \\ TijM_{21} \\ \vdots \\ TijM_{m1}\ \cdots\ \cdots\ \cdots\ \cdots\ TijM_{mn} \end{array}$$

L (vertical axis), N (horizontal axis)

FIG. 5B $$\begin{array}{l} QijM_{11}\ QijM_{12}\ \cdots\ \cdots\ \cdots\ QijM_{1n} \\ QijM_{21} \\ \vdots \\ QijM_{m1}\ \cdots\ \cdots\ \cdots\ \cdots\ QijM_{mn} \end{array}$$

L (vertical axis), N (horizontal axis)

$\alpha = Ptdc/Pb$ $\beta = \text{Ttdc} - \text{Tb}$ $\gamma = OD/ODb$

CONTROL DEVICE OF INTERNAL COMBUSTION ENGINE

TECHNICAL FIELD

The present invention relates to a control device of an internal combustion engine.

BACKGROUND ART

Known in the past has been an internal combustion engine performing premixed charge compression ignition (PCCI) in part of the operating regions of an internal combustion engine. Premixed charge compression ignition is a form of combustion where fuel and air are premixed, then the premixed gas is self-ignited. In premixed charge compression ignition, fuel and air are mixed in advance to a certain extent in this way, then the air-fuel mixture is burned, and therefore there are few locations with locally high concentrations of fuel when burning the air-fuel mixture. As a result, the amount of discharge of smoke can be suppressed.

Further, in performing premixed charge compression ignition, it is known to inject fuel from the fuel injector by main injection and pre-injection before main injection (for example, PLT 1). In particular, in PLT 1, the injection timing of the main injection is fixed and the injection timing of the pre-injection is changed according to the engine operation state, etc., or the injection timing of the main injection and the injection timing of the pre-injection are both changed in the same extent, according to the engine operation state, etc.

CITATION LIST

Patent Literature

PLT 1: Japanese Patent Publication No. 2009-209943A
PLT 2: Japanese Patent Publication No. 2012-011892A
PLT 3: Japanese Patent Publication No. 2012-041896A

SUMMARY OF INVENTION

In performing premixed charge compression ignition, it may also be considered to perform a plurality of pre-injections from the fuel injector and perform the main injection after performing these pre-injections. In this case, the injection timings and the injection amounts of the pre-injections and main injection are set to be optimum values corresponding to the engine operation state (state of internal combustion engine including at least engine load and engine speed).

In this regard, the injection timings and the injection amounts of the pre-injections and main injection corresponding to the engine operation state are set to be optimum when the internal combustion engine is in the middle of steady operation. For this reason, when the internal combustion engine is in the middle of transient operation, the injection timings, etc., of the pre-injections and main injection do not necessarily become the optimum values. For this reason, when the internal combustion engine is in the middle of transient operation, it is necessary to correct the injection timings, etc., of the pre-injections and main injection.

As the technique for correcting the injection timings, etc., of the pre-injections and main injection, as described in PLT 1, the injection timing of main injection may be fixed and the injection timings of pre-injections may be changed. However, when controlling the injection timings in this way, it is not possible to control the ignition timing of the air-fuel mixture formed by the main injection much at all. Further, even if it is possible to control the ignition timing, the possible range in controlling the ignition timing is limited.

As another technique, the injection timing of main injection and the injection timings of pre-injections may both be changed in the same extent. However, if controlling the injection timings in this way, the ignition timings of the air-fuel mixtures formed by pre-injections and the ignition timing of the air-fuel mixture formed by main injection approach each other and as a result the combustion noise becomes greater.

The present invention was made in consideration of the above problem and has as its object to secure the controllability of the ignition timing of an air-fuel mixture formed by main injection while suppressing combustion noise, even while the internal combustion engine is in the middle of transient operation.

The present invention was made so as to solve the problem and has as its gist the following:

(1) A control device of an internal combustion engine for controlling an internal combustion engine comprising a fuel injector directly injecting fuel into a combustion chamber, the control device of an internal combustion engine comprises an injection control part controlling fuel injection from the fuel injector, wherein the injection control part controls fuel injection from the fuel injector so that the fuel injector performs pre-injection a plurality of times, then performs main injection and so that after starting the main injection, at least part of a premixed gas formed by the pre-injections burns by compression self-ignition, the injection control part controls the fuel injector so as to perform the pre-injections and the main injection at basic injection timings calculated based on an engine operation state when the internal combustion engine is in the middle of steady operation, and when the internal combustion engine is in the middle of transient operation, the injection control part performs correction control correcting injection timings of the main injection and the pre-injections from the basic injection timings with respect to the time when the internal combustion engine is in the middle of steady operation, and, in the correction control, the larger the crank angles from TDC of the injection timings of the injections before correction, the larger the amounts of correction of the injection timings of the injections.

(2) The control device of an internal combustion engine according to (1), further comprising an intake pressure detection part detecting or estimating a pressure of intake gas in the combustion chamber, wherein the injection control part, in the correction control, corrects the injection timings of the main injection and the pre-injections so that the higher the pressure of intake gas detected or estimated by the intake pressure detection part, the more the injection timings of the injections are shifted to retarded side injection timings.

(3) The control device of an internal combustion engine according to (1) or (2), further comprising an intake temperature detection part detecting or estimating a temperature of intake gas in the combustion chamber, wherein the in control part, in the correction control, corrects the injection timings of the main injection and the pre-injections so that the higher the temperature of intake gas detected or estimated by the intake temperature detection part, the more the injection timings of the injections are shifted to retarded side injection timings.

(4) The control device of an internal combustion engine according to any one of (1) to (3), further comprising an oxygen density detection part for detecting or estimating an oxygen density of intake gas in the combustion chamber, wherein the injection control part corrects the injection timings of the main injection and the pre-injections so that the higher the oxygen density detected or estimated by the oxygen density detection part, the more the injection timings of the injections are shifted to retarded side injection timings.

Advantageous Effects of Invention

According to the present invention, it is possible to secure the controllability of the ignition timing of an air-fuel mixture formed by main injection while suppressing combustion noise, even while the internal combustion engine is in the middle of transient operation.

BRIEF DESCRIPTION OF DRAWINGS

FIG. 5A is a map for obtaining an injection timing from an engine load and engine speed.

FIG. 5B is a map for obtaining an injection amount from an engine load and engine speed.

DESCRIPTION OF EMBODIMENTS

Figure 1:
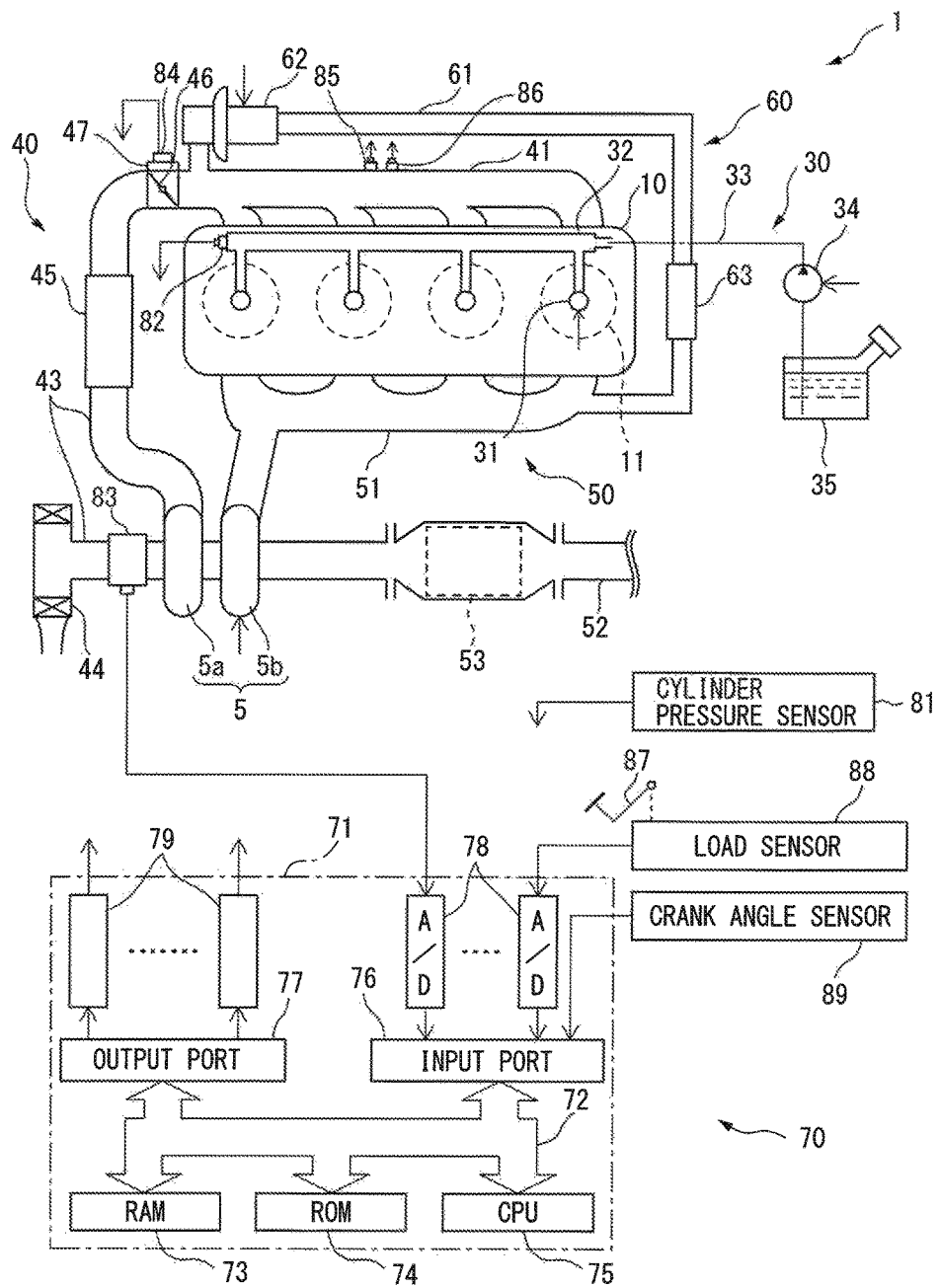
FIG. 1 is a schematic view of the configuration of an internal combustion engine.

Referring to the drawings, embodiments of the present invention will be explained in detail. Note that, in the following explanation, similar components are assigned the same reference numerals.

<Explanation of Internal Combustion Engine as a Whole>

Figure 2:
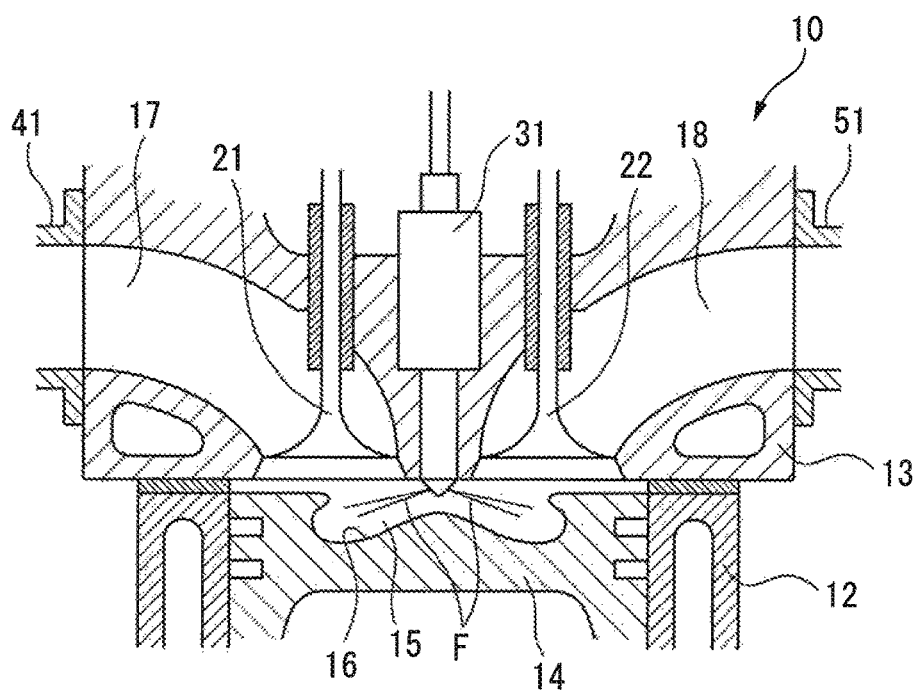
FIG. 2 is a schematic cross-sectional view of an engine body.

First, referring to FIG. 1 and FIG. 2, the configuration of an internal combustion engine 1 in which a control device according to the first embodiment is used, will be explained. FIG. 1 is a schematic view of the configuration of the internal combustion engine 1. FIG. 2 is a schematic cross-sectional view of an engine body 10 of the internal combustion engine 1. The internal combustion engine of the present embodiment uses diesel oil as fuel.

As shown in FIG. 1 and FIG. 2, the internal combustion engine 1 comprises an engine body 10, fuel feed system 30, intake system 40, exhaust system 50, EGR mechanism 60, and control device 70.

The engine body 10 comprises a cylinder block 12 in which a plurality of cylinders 11 are formed and a cylinder head 13. In the cylinders 11, pistons 14 reciprocating in the cylinders 11 are arranged. In the cylinders 11 between the pistons 14 and cylinder head 13, combustion chambers 15 in which the air-fuel mixture burns, are formed. At the top surfaces of the pistons 14, cavities 16 having recessed shapes are formed.

As shown in FIG. 2, the cylinder head 13 is formed with intake ports 17 and exhaust ports 18. These intake ports 17 and exhaust ports 18 are communicated with the combustion chambers 15 of the cylinders 11. Between each combustion chamber 15 and the intake port 17, an intake valve 21 is arranged. This intake valve 21 opens and closes the intake port 17. Similarly, between each combustion chamber 15 and exhaust port 18, an exhaust valve 22 is arranged. This exhaust valve 22 opens and closes the exhaust port 18.

As shown in FIG. 1, the fuel feed system 30 comprises fuel injectors 31, a common rail 32, fuel feed pipe 33, fuel pump 34, and fuel tank 35. Each fuel injector 31 is arranged in the cylinder head 13 so as to directly inject fuel into a combustion chamber 15 of a cylinder 11. In particular, in the present embodiment, each fuel injector 31 is arranged at a center of a top wall surface of the combustion chamber 15 and is configured so that fuel F is injected from the fuel injector 31 toward the periphery in the cavity 16 formed in the piston 14 (FIG. 2).

The fuel injector 31 is communicated through the common rail 32 and fuel feed pipe 33 to the fuel tank 35. At the fuel feed pipe 33, the fuel pump 34 is arranged for pumping out fuel in the fuel tank 35. The fuel pumped out by the fuel pump 34 is supplied through the fuel feed pipe 33 to the common rail 32. Along with the fuel injector 31 being opened, fuel is directly injected from the fuel injector 31 to the inside of the combustion chamber 15.

The intake system 40 comprises an intake manifold 41, intake pipe 43, air cleaner 44, compressor 5a of an exhaust turbocharger 5, intercooler 45, and throttle valve 46. The intake port 17 of each cylinder 11 is communicated with the intake manifold 41, and the intake manifold 41 is communicated through the intake pipe 43 to the air cleaner 44. The intake pipe 43 is provided with the compressor 5a of the exhaust turbocharger 5 compressing and discharging intake air flowing through the intake pipe 43 and the intercooler 45 cooling the air compressed by the compressor 5a. The intercooler 45 is arranged at a downstream side of the compressor 5a in the direction of flow of intake air. The throttle valve 46 is arranged in the intake pipe 43 between the intercooler 45 and the intake manifold 41. The throttle valve 46 can change the open area of the intake passage by being turned by a throttle valve drive actuator 47. Note that, the intake ports 17, intake manifold 41, and intake pipe 43 form intake passages supplying intake gas to the combustion chambers 15.

The exhaust system 50 comprises an exhaust manifold 51, exhaust pipe 52, turbine 5b of the exhaust turbocharger 5, and exhaust after-treatment device 53. The exhaust port 18 of each cylinder 11 is communicated with the exhaust manifold 51, and the exhaust manifold 51 is communicated with the exhaust pipe 52. At the exhaust pipe 52, the turbine 5b of the exhaust turbocharger 5 is provided. The turbine 5b is driven to rotate by the energy of the exhaust gas. The compressor 5a and turbine 5b of the exhaust turbocharger 5 are connected by a rotary shaft. If the turbine 5b is driven to rotate, along with this, the compressor 5a rotates and, accordingly, the intake air is compressed. Further, at the exhaust pipe 52, the exhaust after-treatment device 53 is provided at the downstream side, in the direction of flow, of exhaust of the turbine 5b. The exhaust after-treatment device 53 is a device for cleaning, then discharging exhaust gas to the outside air. The exhaust after-treatment device 53 is provided with various types of exhaust purification catalysts and filters for trapping harmful substances for removing the harmful substances, etc. Note that, the exhaust ports 18, exhaust manifold 51, and exhaust pipe 52 form exhaust passages discharging exhaust gas from the combustion chambers 15.

An EGR mechanism 60 comprises an EGR pipe 61, EGR control valve 62, and EGR cooler 63. The EGR pipe 61 is connected to the exhaust manifold 51 and intake manifold 41 and connect these together. At the EGR pipe 61, the EGR cooler 63 is provided for cooling EGR gas flowing through the EGR pipe 61. In addition, at the EGR pipe 61, the EGR control valve 62 able to change the open area of an EGR passage formed by the EGR pipe 61, is provided. By controlling the opening degree of the EGR control valve 62, the amount of flow of EGR gas recirculating from the exhaust manifold 51 to the intake manifold 41 is adjusted.

The control device 70 comprises an electronic control unit (ECU) 71 and various types of sensors. The ECU 71 is comprised of a digital computer and comprises components connected with each other through a bidirectional bus 72, such as a RAM (random access memory) 73, ROM (read only memory) 74, CPU (microprocessor) 75, input port 76, and output port 77.

At the cylinder head 13, a cylinder pressure sensor 81 is arranged for detecting the pressure in the cylinders 11 (cylinder pressure). Further, at the common rail 32, a fuel pressure sensor 82 is provided for detecting the pressure of the fuel in the common rail 32, that is, the pressure of the fuel injected from the fuel injectors 31 to the insides of the cylinders 11 (injection pressure). At the intake pipe 43, at the upstream side of the compressor 5a of the exhaust turbocharger 5 in the direction of flow of intake, an air-flow meter 83 is provided for detecting the amount of flow of air flowing through the inside of the intake pipe 43. At the throttle valve 46, a throttle opening degree sensor 84 is provided for detecting its opening degree (throttle opening degree). In addition, at the intake manifold 41, an intake pressure sensor 85 is provided for detecting the pressure of the intake gas in the intake manifold 41, that is, the pressure of the intake gas sucked into the cylinders 11 (intake pressure). Further, at the intake manifold 41, an intake temperature sensor 86 is provided for detecting the temperature of the intake gas in the intake manifold 41, that is, the temperature of the intake gas sucked into the cylinders 11 (intake temperature). The outputs of these cylinder pressure sensor 81, fuel pressure sensor 82, air flow meter 83, throttle opening degree sensor 84, intake pressure sensor 85, and intake temperature sensor 86 are input through corresponding AD converters 78 to the input port 76.

Further, a load sensor 88 generating an output voltage proportional to the amount of depression of an accelerator pedal 87 is connected to the accelerator pedal 87. The output voltage of the load sensor 88 is input through a corresponding AD converter 78 to the input port 76. Therefore, in the present embodiment, the amount of depression of the accelerator pedal 87 is used as the engine load. A crank angle sensor 89 for example generates an output pulse every time the crankshaft of the engine body 10 rotates by for example 15 degrees. This output pulse is input to the input port 76. At the CPU 75, the engine speed is calculated from the output pulse of this crank angle sensor 89.

On the other hand, the output port 77 of the ECU 71 is connected through corresponding driver circuits 79 to the actuators controlling the operation of the internal combustion engine 1. In the example shown in FIG. 1 and FIG. 2, the output port 77 is connected to the fuel injectors 31, fuel pump 34, throttle valve drive actuator 47, and EGR control valve 62. The ECU 71 outputs control signals controlling these actuators from the output port 77 to control the operation of the internal combustion engine 1.

The control device 70 configured as explained above comprises an intake pressure detection part, intake temperature detection part, oxygen density detection. part, and injection control part.

The intake pressure detection part detects the pressure of the intake gas supplied to the combustion chambers 15 of the cylinders 11. In particular, in the present embodiment, the intake pressure detection part detects the pressure of the intake gas supplied to the combustion chambers 15 when the intake valves 21 are closing. Specifically, the intake pressure sensor 85 provided at the intake manifold 41 is used to detect the pressure of the intake gas in the intake manifold 41. When the intake valves 21 are closing, the pressure of the intake gas supplied to the combustion chambers 15 is substantially equal to the pressure in the intake manifold 41, and therefore by detecting the pressure of the intake gas in the intake manifold 41, it is possible to detect the pressure of the intake gas supplied to the combustion chambers 15 when the intake valves 21 are closing.

Note that, the intake pressure detection part need not use the intake pressure sensor 85 and may estimate the pressure of the intake gas using model equations based on the opening degree of the throttle valve 46, the opening degree of the EGR control valve 62, etc. Further, the intake pressure detection part may also use, as the pressure of the intake gas supplied to the combustion chambers 15, the pressure in the combustion chambers 15 at compression TDC when assuming the air-fuel mixture is not burning in the combustion chambers 15. In this case, the pressure in the combustion chambers 15 at compression TDC (compression end pressure) is estimated based on the pressure and temperature of the intake gas when the intake valves 21 are closing.

The intake temperature detection part detects the temperature of the intake gas supplied to the combustion chambers 15 of the cylinders 11. In particular, in the present embodiment, the intake temperature detection part detects the temperature of the intake gas supplied to the combustion chambers 15 when the intake valves 21 are closing. Specifically, the intake temperature sensor 86 provided at the intake manifold 41 is used to detect the temperature of the intake gas in the intake manifold 41. When the intake valves 21 are closing, the temperature of the intake gas supplied to the combustion chambers 15 is substantially equal to the temperature in the intake manifold 41, and therefore by detecting the temperature of the intake gas in the intake manifold 41, it is possible to detect the temperature of the intake gas supplied to the combustion chambers 15 when the intake valves 21 are closing.

Note that, the intake temperature detection part need not use the intake temperature sensor 86 and may estimate the temperature of the intake gas using model equations based on the opening degree of the throttle valve 46, the opening degree of the EGR control valve 62, etc. Further, the intake temperature detection part may also use, as the temperature of the intake gas supplied to the combustion chambers 15, the temperature in the combustion chambers 15 at compression TDC when assuming the air-fuel mixture is not burning in the combustion chambers 15 (compression end temperature). In this case, the temperature in the combustion chambers 15 at compression TDC is estimated based on the pressure and temperature of the intake gas when the intake valves 21 are closing.

The oxygen density detection part detects or estimates the oxygen density of the intake gas supplied to the combustion chambers 15 of the cylinders 11. In this regard, in the present embodiment, since the EGR mechanism 60 is provided, part of the exhaust gas is supplied to the combustion chambers 15 of the cylinders 11 again according to the opening degree of the EGR control valve 62. Further, when it is possible to change the valve overlap time period where both the intake valves 21 and the exhaust valves 22 are open, part of the exhaust gas discharged once into the exhaust ports 18 is again supplied to the combustion chambers 15 according to the valve overlap time period. In addition, when it is possible to change the closing timings of the exhaust valves 22, part of the exhaust gas remains in the combustion chambers 15 without being discharged from the combustion chambers 15 to the exhaust port 18, according to the closing timings of the exhaust valves 22. Hereinafter, the exhaust gas supplied to or remaining at the combustion chambers 15 in this way is referred to as the "EGR gas". The EGR gas is exhaust gas already burned once in the combustion chambers 15, and therefore the EGR gas does not contain much oxygen at all. For this reason, the larger the ratio of the EGR gas in the intake gas supplied to the combustion chambers 15 (EGR rate), the lower the oxygen density of the intake gas.

Further, as explained above, the internal combustion engine 1 of the present embodiment comprises the exhaust turbocharger 5. If the pressure of the intake gas after being supercharged by the compressor 5a of the exhaust turbocharger 5 (supercharging pressure) becomes higher, the amount of oxygen included per unit volume increases and accordingly the oxygen density becomes higher. For this reason, in the present embodiment, the oxygen density of the intake gas supplied to the combustion chambers 15 is estimated based on the opening degree of the EGR control valve 62, the valve timings of the intake valves 21 and exhaust valves 22, the supercharging pressure, etc. Note that, the oxygen density detection part, for example, may also estimate or detect the oxygen density by another technique such as detecting the oxygen density based on an oxygen concentration sensor, etc.

Note that, the volume in a combustion chamber 15 is known in advance, and therefore if the amount of oxygen of the intake gas supplied to the inside of the combustion chamber 15 is known, it is possible to estimate the oxygen density of intake gas supplied to the combustion chamber 15. Therefore, it is also possible to estimate the oxygen density by estimating the amount of oxygen of the intake gas supplied to the inside of the combustion chamber 15 based on the above-mentioned opening degree of the EGR control valve 62, etc.

The injection control part controls the fuel injectors 31, etc., so as to be able to achieve the desired combustion in the combustion chambers 15 based on the outputs of the various sensors and the outputs of the above-mentioned intake pressure detection part, intake temperature detection part, and oxygen density detection part. The specific injection control by the injection control part will be explained in detail below.

<Explanation of Combustion Mode>

Figure 3:
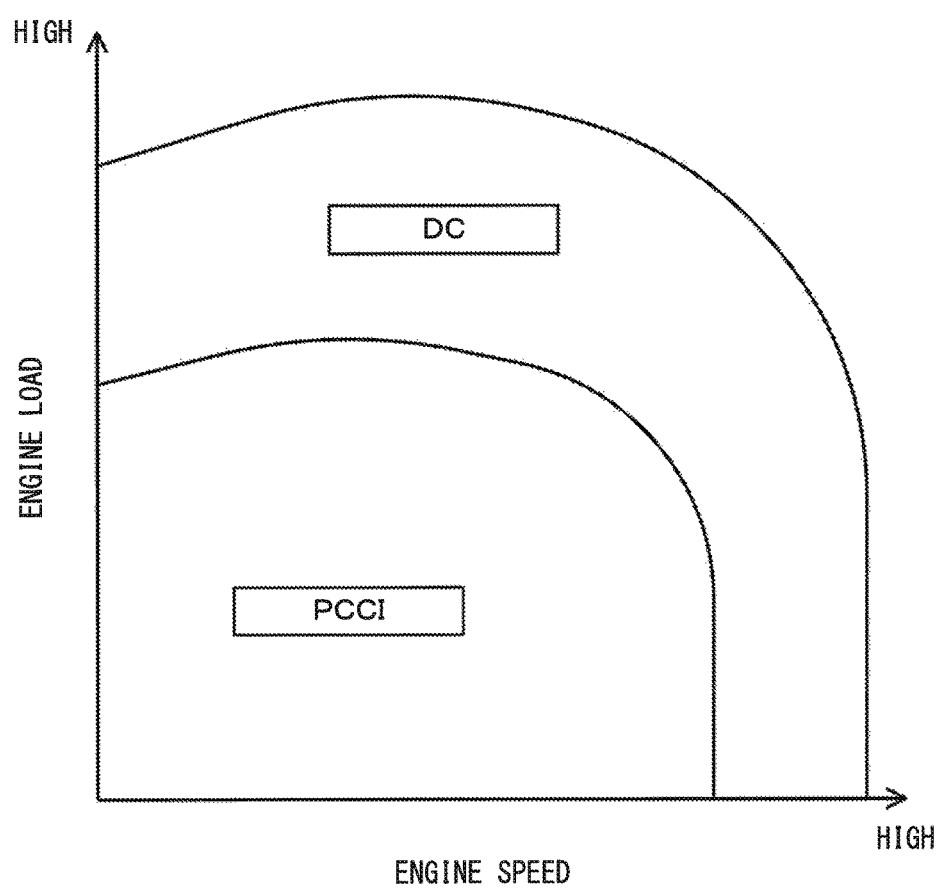
FIG. 3 is a view showing a relationship between an engine operation state and an operating mode.

Next, referring to FIG. 3, injection control by the injection control part of the control device 70 of the present embodiment will be explained. FIG. 3 is a view showing the relationship between the engine operation state, determined based on at least the engine load and the engine speed, and the operating mode. In the present embodiment, the injection control part of the control device 70 operates the internal combustion engine 1 in the two operating modes of the premixed charge compression ignition mode (hereinafter, referred to as the "PCCI mode") and the diffusive combustion mode (hereinafter, referred to as the "DC mode").

The injection control part of the control device 70 controls the fuel injectors 31, etc., so that the fuel injected into the combustion chambers 15 burns by diffusive combustion when the operating mode is the DC mode. In this regard, "diffusive combustion" means the mode of combustion where fuel burns substantially without delay after fuel is injected, that is, the mode of combustion where fuel burns with a short ignition delay time (time from when fuel is injected into the combustion chamber 15 to when that fuel self-ignites) after fuel is injected. Specifically, when the operating mode is the DC mode, the time from when the later explained main injection is started from the fuel injectors 31 to when that fuel is ignited, is less than several msec.

Further, the injection control part controls the fuel injectors 31, etc., so that when the operating mode is the PCCI mode, the fuel injected into the combustion chambers 15 ignites by premixed charge compression ignition. In this regard, "premixed charge compression ignition" means the mode of combustion when fuel is burned after a premixing time of air and fuel after fuel injection elapses to a certain extent, that is, a mode of combustion where fuel burns by a longer ignition delay time than the time of diffusive combustion, after fuel injection. Specifically, when the operating mode is the PCCI mode, the time from when the later explained main injection is started from the fuel injector 31 to when that fuel is ignited, is greater than several msec. In some cases, the already injected main injection fuel is ignited before the main injection fuel finishes being injected, but in this Description, such a mode of combustion is also included in premixed charge compression ignition.

In comparing diffusion combustion and premixed charge compression ignition, in premixed charge compression ignition, the premixed gas burns after providing a certain extent of premixing period of fuel and air after fuel injection. As a result, fuel is diffused during the premixing period, and therefore it is possible to reduce the ratio of fuel burning in the state of a high fuel concentration (that is, state of high equivalent ratio $\phi$). If a high fuel concentration air-fuel mixture burns, soot is produced due to insufficient oxygen, and therefore with premixed charge compression ignition, it is possible to suppress the production of soot and possible to improve the exhaust emission.

However, when the engine operation state is the high load operating state, it is not possible to perform premixed charge compression ignition. This is because that if the engine operation state is the high load operating state, the temperature in the combustion chambers 15 rises, and therefore the premixed gas self-ignites early.

On the other hand, with diffusive combustion, the air-fuel mixture formed by the main injection IJM is not premixed, and therefore even if the temperature in the combustion chambers 15 rises, the premixed gas formed by the main injection IJM will never self-ignite. For this reason, even when the engine operation state is the high load operating state, diffusive combustion can be performed.

However, with diffusive combustion, the fuel burns with substantially no delay after fuel injection, and therefore the fuel burns without being sufficiently diffused. For this reason, the ratio of fuel burning in a state of a high fuel concentration increases and soot is more easily produced. Therefore, compared with premixed charge compression ignition, soot is easily discharged from the combustion chambers 15.

Therefore, in the present embodiment, the injection control part sets the operating mode to the PCCI mode when, as shown in FIG. 3, the engine operation state is in the PCCI region where the engine load and engine speed are low. In addition, the injection control part sets the operating mode to the DC mode when the engine operation state is in the DC region where the engine load and/or the engine speed is high. Due to this, if the engine load or the engine speed is high, by performing diffusive combustion, it is possible to maintain the operation of the internal combustion engine. When the engine load or the engine speed is low, by performing premixed charge compression ignition, it is possible to suppress production of soot in the combustion chambers 15.

<Injection Control in Steady State>

Figure 4:
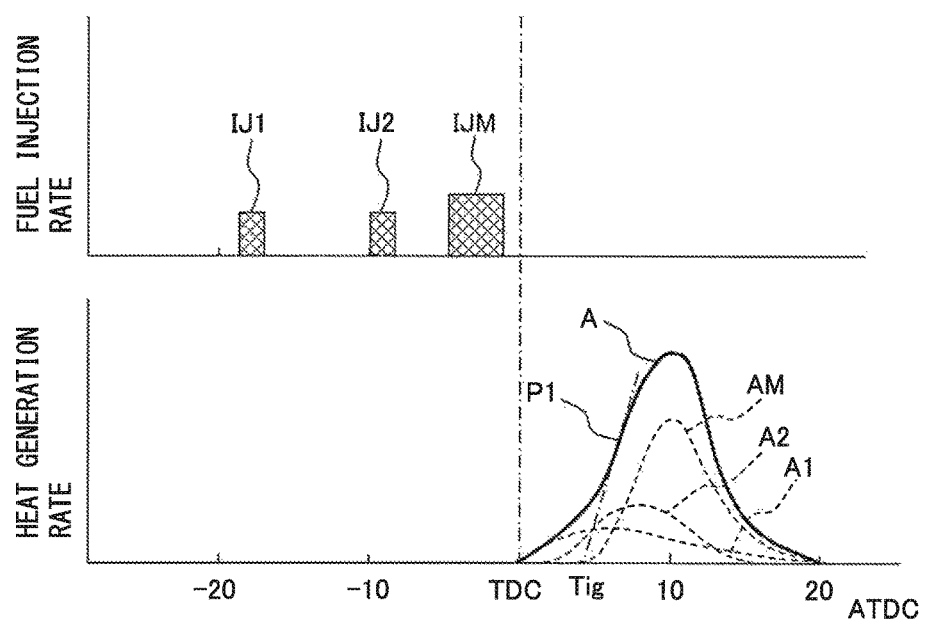
FIG. 4 is a view showing trends, with respect to crank angle, of fuel injection rates and heat generation rates by combustion in a combustion chamber, when an operating mode is a PCCI mode.

Next, referring to FIG. 4, the fuel injection control from the fuel injectors 31 when the internal combustion engine is in the middle of steady operation in the state where the operating mode is the PCCI mode, will be explained. FIG. 4 is a view showing the trend, with respect to crank angle, of the fuel injection rates and the heat generation rates by combustion in the combustion chambers 15, when the operating mode is the PCCI mode.

As will be understood from FIG. 4, in the present embodiment, the injection control part of the control device 70 controls the fuel injectors 31 so as to perform pre-injection a predetermined number of times, then perform main injection. In particular, in the example shown in FIG. 4, two pre-injections of the first pre-injection IJ1 and the second pre-injection IJ2 are successively performed, and then the main injection IJM is performed.

«General Method of Control of Injections»

The method of control of the injection timings and the injection amounts of these first pre-injection IJ1, second pre-injection IJ2, and main injection IJM will be explained in brief. First, the injection timing of the main injection IJM is set so that the timing Tig of self-ignition of the premixed gas formed by the main injection IJM becomes the target main injection self-ignition timing.

The target main injection self-ignition timing is set so as to be after compression TDC and to satisfy the demand for constant volume degree. The constant volume degree becomes maximum when the self-ignition timing is compression TDC and becomes smaller as the self-ignition timing is separated further from compression TDC. For this reason, in order to raise the constant volume degree, that is, in order to raise the thermal efficiency in the internal combustion engine, the target main injection self-ignition timing is set to a timing after compression TDC and close to compression TDC.

Further, the ignition delay time from the injection timing of the main injection IJM to the main injection self-ignition timing changes depending on the engine operation state. For example, the higher the engine load, the higher the cylinder pressure and the cylinder temperature, and therefore the ignition delay time becomes shorter. For this reason, the injection timing TijM of the main injection IJM is, for example, set based on the engine load L and the engine speed N using a map such as shown in FIG. 5A, that is, based on the engine operation state. Hereinafter, the injection timing of the main injection IJM set based on the engine operation state in this way will also be referred to as the "basic injection timing of the main injection IJM".

The injection amount of the main injection IJM is set to the total injection amount demanded according to the engine load minus the injection amounts of the first pre-injection IJ1 and the second pre-injection IJ2. The total injection amount is set to become larger as the engine load becomes higher. Specifically, the injection amount QijM of the main injection IJM is, for example, set based on the engine load L and the engine speed N using a map such as shown in FIG. 5B, that is, based on the engine operation state. Hereinafter, the injection amount of the main injection IJM set based on the engine operation state in this way will also be referred to as the "basic injection amount of the main injection IJM".

The injection timings and the injection amounts of the first pre-injection IJ1 and the second pre-injection IJ2 are set so that before the start of main injection IJM, no heat at all or almost no heat is generated due to combustion of the premixed gases formed by the first pre-injection IJ1 and the second pre-injection IJ2. That is, the injection timings and the injection amounts of the first pre-injection IJ1 and the second pre-injection IJ2 are set so that the premixed gases formed by the pre-injections IJ1 and IJ2 start to burn by compression self-ignition after the start of main injection IJM. If the injection timings of the first pre-injection IJ1 and the second pre-injection IJ2 become earlier, the premixed gases formed by these injections will tend to ignite early. Further, if the injection amounts of the first pre-injection IJ1 and the second pre-injection IJ2 become greater, the premixed gases formed by these injections will tend to ignite early.

On the other hand, if the first pre-injection IJ1 and the second pre-injection IJ2 are too close to the main injection IJM or if the injection amounts of the first pre-injection IJ1 and the second pre-injection IJ2 are too small, the timings of heat generation of the air-fuel mixtures formed by the in no longer are dispersed. As a result, the effect of reduction of the combustion noise explained later becomes smaller. Therefore, in the present embodiment, the injection timings and the injection amounts of the first pre-injection IJ1 and the second pre-injection IJ2 are set so that the effect of reduction of the combustion noise is larger within a range where the premixed gases formed by these injections do not burn before the start of injection of the main injection IJM.

Further, in the present embodiment, the injection timings and the injection amounts of the first pre-injection IJ1 and the second pre-injection IJ2 are respectively set so that after the main injection IJM is started, the premixed gas formed by the first pre-injection IJ1 first self-ignites, then the premixed gas formed by the second pre-injection IJ2 self-ignites and, finally, the premixed gas formed by the main injection IJM self-ignites. That is, the injection timings and the injection amounts of the first pre-injection IJ1 and the second pre-injection IJ2 are respectively set so that the premixed gases formed by the injections start to burn by compression self-ignition in stages.

Furthermore, in the present embodiment, the injection timings of the first pre-injection IJ1 and the second pre-injection IJ2 are set considering also the robustness of the combustion, etc. The specific method of setting the injection timings of the first pre-injection IJ1 and the second pre-injection IJ2 will be explained in detail later.

The heat generation rate pattern A of FIG. 4 show the trend in the heat generation rates in the combustion chambers 15 when performing such fuel injection. The heat generation rate pattern A shows the heat generation rate pattern obtained by combining the heat generation rates of the heat generation rate pattern A1, heat generation rate pattern A2, and heat generation rate pattern AM. The heat generation rate pattern A1 shows the trend in the heat generation rate when the air-fuel mixture formed by the first pre-injection IJ1 burns. Further, the heat generation rate pattern A2 shows the trend in the heat generation rate when the air-fuel mixture formed by the second pre-injection IJ2 burns. In addition, the heat generation rate pattern AM shows the trend in the heat generation rate when the air-fuel mixture formed by the main injection IJM burns.

As explained above, in the present embodiment, fuel is injected from the fuel injectors 31 so that the air-fuel mixtures formed by the injections start burning by compression ignition combustion in stages. For this reason, it is possible to disperse the timings of heat generation by the air-fuel mixtures respectively formed by the first pre-injection IJ1, the second pre-injection IJ2, and the main injection IJM. Due to this, it is possible to shift the crank angles at which the peaks occur at the heat generation rate patterns A1, A2, and AM. As a result, the peak value of the actual heat generation rate pattern A obtained by combining these heat generation rate patterns A1, A2, and AM can be reduced compared with, for example, a method of injection where all of the fuel is injected by a single main injection. If the peak value of the actual heat generation rate pattern A becomes smaller, the combustion noise tends to become smaller, and therefore in the present embodiment, the combustion noise can be reduced by injecting fuel by the mode such as explained above.

Note that, it is difficult to actually measure the heat generation rate pattern AM formed by the air-fuel mixture formed by the main injection IJM. Therefore, in the present embodiment, in obtaining the main injection self-ignition timing from the actual heat generation rate pattern A, the crank angle (in the example of FIG. 4, Tig) where the tangent line at the location where the slope of the heat generation rate becomes maximum in the actual heat generation rate pattern A (in the example shown in FIG. 4, P1) and the abscissa axis intersect, is deemed to be the main injection self-ignition timing.

<Method of Control of First Pre-injection>

As explained above, the injection timing and the injection amount of the first pre-injection. IJ1 are set so that the premixed gas formed by the first pre-injection IJ1 does not burn before the start of the main injection IJM and self-ignites first after the main injection IJM is started. In addition, the injection timing and injection amount of the first pre-injection IJ1 are set so that the combustion noise is reduced. The specific setting method will be explained below.

In this regard, combustion noise changes due to the peak value of the actual heat generation rate pattern and, in addition, the slope of the heat generation rate at the time the heat generation rate rises (in particular, the maximum value of that slope. Hereinafter, referred to as the "slope at the time of rise of the heat generation rate"). The larger the slope at the time of rise of the heat generation rate, the larger the combustion noise. Therefore, by making the peak value of the actual heat generation rate pattern smaller and, in addition, making the slope at the time of rise of the heat generation rate smaller, it is possible to keep the combustion noise small.

As explained above, the actual heat generation rate pattern A is a combination of the heat generation rate patterns A1, A2, and AM. Therefore, if possible to keep the peak value and the slope at the time of rise of the heat generation rate in the heat generation rate pattern A1 small, it would be possible to reduce the peak value and the slope at the time of rise of the heat generation rate in the actual heat generation rate pattern A and as a result possible to reduce the combustion noise.

In this regard, when making a premixed gas burn by compression self-ignition, the smaller the equivalent ratio $\phi$ of the premixed gas, the slower the combustion speed and the longer the combustion time. As a result, the peak value of the heat generation rate pattern and slope at the time of rise of the heat generation rate occurring due to the combustion become smaller. For this reason, by setting the injection timing and the injection amount of the first pre-injection IJ1 so that the premixed gas burns by compression self-ignition after the equivalent ratio $\phi$ of the premixed gas formed by the first pre-injection IJ1 becomes smaller to a certain extent, it is possible to make the peak value of the heat generation rate pattern and the slope at the time of rise of the heat generation rate smaller. In particular, in the present embodiment, the injection timing and the injection amount of the first pre-injection IJ1 are set so that the premixed gas burns by compression self-ignition after the equivalent ratio $\phi$ of almost all premixed gas formed by the first pre-injection IJ1 becomes less than 1.0. Note that, if the equivalent ratio $\phi$ is 1.0, it shows that the premixed gas is at the stoichiometric air-fuel ratio, if less than 1.0, it shows that air is in excess, that is, the premixed gas is lean, and if larger than 1.0, it shows the fuel is in excess, that is, the premixed gas is rich.

In this regard, the equivalent ratio $\phi$ of premixed gas formed by fuel injected from the fuel injectors 31 basically depends on the elapsed time from when injecting fuel if the amounts of fuel injection are constant. If the time elapsed from injection of fuel becomes longer, the fuel widely diffuses, and therefore the equivalent ratio $\phi$ becomes smaller. Therefore, in order for the equivalent ratio $\phi$ of almost all of the premixed gas formed by the first pre-injection IJ1 to become less than 1.0, a premixing time (hereinafter, this will be referred to as "the first premixing time") corresponding to the fuel injection amount is necessary. On the other hand, after the elapse of the ignition delay time τ from fuel injection by the first pre-injection IJ1, the premixed gas formed by the first pro-injection IJ1 self-ignites. For this reason, in order to make the premixed gas burn by compression self-ignition after the equivalent ratio ϕ of almost all of the premixed gas formed by the first pre-injection IJ1 becomes less than 1.0, it is necessary that the ignition delay time τ is longer than the above-mentioned first premixing time.

In this regard, the ignition delay time τ from injection of fuel from the fuel injectors 31 to ignition of the premixed gas becomes longer as the injection timing of the first pre-injection IJ1 is advanced more from compression TDC. Therefore, by suitably controlling the injection timing of the first pre-injection IJ1, it is possible to make the ignition delay time τ of the premixed gas formed by the first pre-injection IJ1 longer than the first premixing time. However, if the injection timing of the first pre-injection IJ1 is advanced too much, part of the fuel injected by the first pre-injection IJ1 sticks to the wall surfaces of the combustion chambers 15. Therefore, in the present embodiment, the injection timing of the first pre-injection IJ1 is set so that the ignition delay time τ of the premixed gas formed by the first pre-injection IJ1 becomes longer than the first premixing time within a range where part of the injected fuel does not stick to the wall surfaces of the combustion chambers 15.

Further, the injection amount of the first pre-injection IJ1 is set so that the ratio of the injection amount of the first pre-injection IJ1 to the injection amount of the second pre-injection IJ2 becomes as large as possible. However, if the injection amount of the first pre-injection IJ1 is made too large, part of the fuel injected by the first pre-injection IJ1 will end up sticking to the wall surfaces of the combustion chambers 15. Therefore, the injection amount of the first pre-injection IJ1 is set to become a large as possible within a range where part of the injected fuel does not stick on the wall surfaces of the combustion chambers 15.

Note that, the injection amount of the first pre-injection IJ1 is set so that, based on the engine load, basically the injection amount becomes greater as the engine load becomes higher. Further, the injection amount of the first pre-injection IJ1 is also set based on the engine speed so that part of the fuel injected by the first pre-injection IJ1 does not stick to the wall surfaces of the combustion chambers 15. Therefore, the injection amount Qij1 of the first pre-injection IJ1 is, for example, set based on the engine operation state using a map similar to the map shown in FIG. 5B. Hereinafter, the injection timing of the first pre-injection IJ1 set based on the engine operation state will also be referred to as the "basic injection timing of the first pre-injection IJ1".

Further, the first premixing time required for the equivalent ratio ϕ of almost all of the premixed gas formed by the first pre-injection IJ1 to become less than 1.0 becomes longer, as the injection amount of the first pre-injection IJ1 become greater. Further, to secure the first premixing time, it is necessary to perform the first pre-injection IJ1 more to the advanced side, as the engine speed becomes higher. Therefore, the injection timing Tij1 of the first pre-injection IJ1 is, for example, set based on the engine operation state using a map similar to the map shown in FIG. 5A. Hereinafter, the injection amount of the first pre-injection IJ1 set based on the engine operation state in this way will also be referred to as the "basic injection timing of the first pre-injection IJ1".

According to the present embodiment, by setting the injection timing and the injection amount of the first pre-injection in this way, the peak value of the heat generation rate pattern A1 and the slope at the time of rise of the heat generation rate when the premixed gas formed by the first pre-injection IJ1 self-ignites by compression, become smaller than the peak values of the heat generation rate patterns A2 and AM and the slopes at the time of rise of the heat generation rate when the premixes formed by the second pre-injection IJ2 and main injection IJM burn by compression ignition.

«Method of Control of Second Pre-Injection»

As explained above, the injection timing and the injection amount of the second pre-injection IJ2 are set so that the premixed gas formed by the second pre-injection IJ2 is not burned before the start of the main injection IJM and so that it self-ignites after the main injection IJM is started and after the premixed gas formed by the first pre-injection IJ1 starts to be burned. In addition, the injection timing of the second pre-injection IJ2 is set so as to stabilize the ignition timing of the premixed gas formed by the main injection IJM. The specific setting method will be explained below.

In the present embodiment, the second pre-injection IJ2 is performed right before the main injection IJM so as to ignite before the premixed gas formed by the main injection IJM ignites. Due to this, the heat of combustion when the premixed gas formed by the second pre-injection IJ2 is burned causes the cylinder temperature to rise. As a result, it is possible to cause self-ignition of the premixed gas formed by the main injection IJM. In other words, in the present embodiment, the ignition timing of the second pre-injection IJ2 is controlled to a timing where self-ignition of the premixed gas formed by the main injection IJM is caused by the heat generated by self-ignition of the premixed gas formed by the second pre-injection IJ2, after the start of injection of the main injection IJM.

Figure 6:
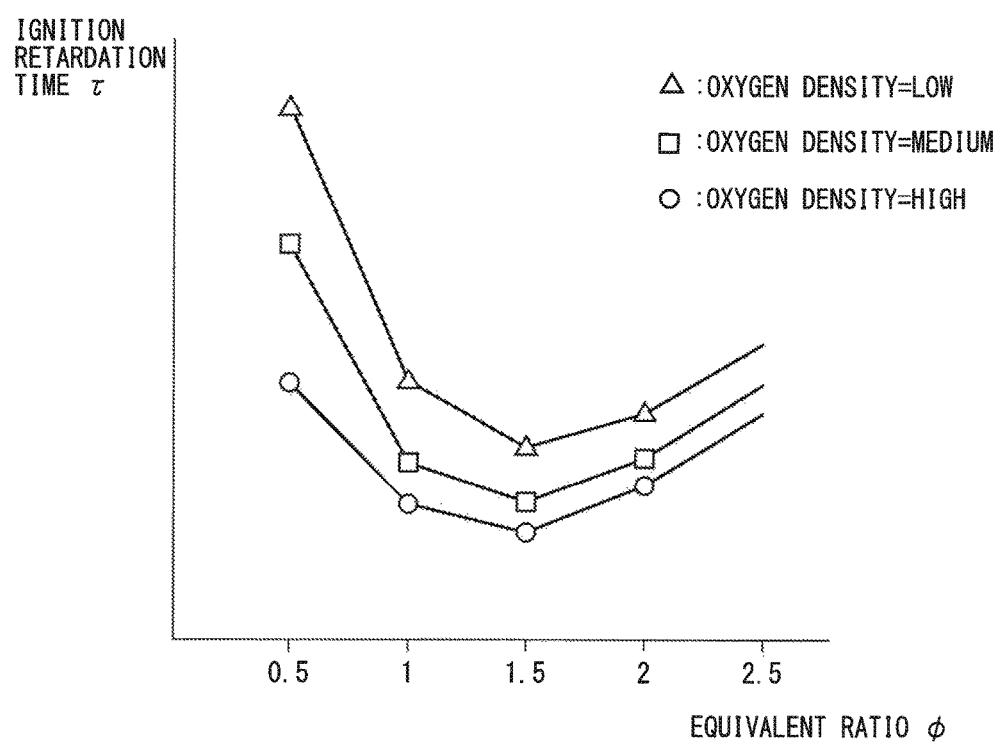
FIG. 6 is a view showing a relationship between an equivalent ratio and ignition delay time for every oxygen density in a combustion chamber.

In this regard, in this case, in order to stabilize the ignition timing of the premixed gas formed by the main injection IJM, it is necessary to stabilize the ignition timing of the premixed gas formed by the second pre-injection IJ2. This will be explained while referring to FIG. 6. FIG. 6 is a view showing the relationship between the equivalent ratio ϕ and the ignition delay time τ for each oxygen density in the combustion chambers 15.

As will be understood from FIG. 6, if the equivalent ratio ϕ is smaller than 1, the ignition delay time τ becomes longer. Further, the ignition delay time τ greatly changes if the oxygen density changes. The fact that the ignition delay time τ is long in this way, means that the premixed gas becomes hard to ignite. Accordingly, it means that the self-ignition timing of the premixed gas easily fluctuates. Further, the ignition delay time τ changes due to the oxygen density. Therefore, it means that for example, if the EGR rate changes and thus the oxygen density changes, the ignition timing of the premixed gas greatly changes.

On the other hand, if the equivalent ratio ϕ becomes 1.0 or more, there is sufficient fuel, and therefore the premixed gas becomes easier to ignite compared to when the equivalent ratio is less than 1.0. For this reason, the ignition delay time τ becomes shorter and accordingly the self-ignition timing of the premixed gas becomes harder to fluctuate. Further, the change of the ignition delay time τ when the oxygen density changes becomes smaller, and therefore, for example, even when the EGR rate changes and thus the oxygen density changes, the fluctuation of the ignition timing of the premixed gas becomes smaller. Further, if the equivalent ratio ϕ becomes larger than 2.0, the ambient temperature falls due to the latent heat of evaporation of the fuel, and the premixed gas becomes harder to ignite. As a result, the ignition delay time τ becomes longer.

From the above, as will be understood from FIG. 6, when the equivalent ratio φ is between 1.0 and 2.0, the ignition delay time τ is shorter and, further, the change of the ignition delay time τ when the oxygen density changes is smaller. Therefore, when the equivalent ratio φ of the premixed gas formed by the second pre-injection IJ2 is 1.0 to 2.0, by causing this premixed gas to self-ignite, it is possible to stabilize the self-ignition timing of the premixed gas formed by the second pre-injection IJ2. As a result, it is also possible to stabilize the self-ignition timing of the premixed gas formed by the main injection IJM, and therefore it is possible to precisely control the self-ignition timing of the main injection to the target main injection self-ignition timing.

In this regard, as explained above, the equivalent ratio φ of the premixed gas formed by the fuel injected from the fuel injector 31 basically depends on. the time elapsed from injection of fuel, if the amounts of fuel injection are constant. As the time elapsed from injection of the fuel becomes longer, the equivalent ratio φ becomes smaller. Therefore, in order for the equivalent ratio φ of almost all of the premixed gas formed by the second pre-injection IJ2 to be 1.0 to 2.0, the premixing time corresponding to the amount of fuel injection (hereinafter, this will be referred to as "the second premixing time") is necessary (second premixing time<first premixing time).

On the other hand, the premixed gas formed by the second pre-injection IJ2 self-ignites after the elapse of the ignition delay time from the fuel injection by the second pre-injection IJ2. For this reason, when the equivalent ratio φ of almost all the premixed gas formed by the second pre-injection IJ2 is from 1.0 to 2.0, to make this premixed gas burn by compression self-ignition, the above-mentioned second premixing time and ignition delay time have to become the same extent. Therefore, in the present embodiment, the injection timing of the second pre-injection 122 is set so that the ignition delay time of the premixed gas formed by the second pre-injection IJ2 is equal to the second premixing time.

Note that, the second pre-injection IJ2 is performed at the time of the state where the cylinder temperature and cylinder pressure are higher than the first pre-injection IJ1, and the premixed gas formed by the second pre-injection IJ2 is a premixed gas richer than the premixed gas formed by the first pre-injection IJ1. For this reason, the ignition delay time τ of the premixed gas formed by the second pre-injection IJ2 tends to become shorter than the ignition delay time τ of the premixed gas formed by the first pre-injection IJ1.

Therefore, in order to make the rich premixed gas formed by the second pre-injection IJ2 burn by self-ignition after the main injection IJM is performed and after the premixed gas formed by the first pre-injection IJ1 burns by self-ignition, the injection timing of the second pre-injection IJ2 has to approach necessarily the injection timing of the main injection IJM.

On the other hand, the first pre-injection IJ1 is performed at the time of the state where the cylinder temperature and cylinder pressure are low. The premixed gas formed by the first pre-injection IJ1 is a lean premixed gas. For this reason, the ignition delay time τ of the premixed gas formed by the first pre-injection IJ1 tends to become longer conversely to the ignition delay time τ of the premixed gas formed by the second pre-injection IJ2. Therefore, in order to make the premixed gas formed by the first pre-injection IJ1 burn by self-ignition first after performing the main injection IJM, the injection timing of the first pre-injection IJ1 has to be far from the injection timing of the main injection IJM.

For this reason, in order to perform divided injection and making the premixes formed by the injections self-ignite in stages after performing the main injection IJM like in the present embodiment, as shown in FIG. 4, the crank interval from the first pre-injection IJ1 to the second injection IJ2 becomes larger than the crank interval from the second injection IJ2 to the main injection IJM.

Note that, the injection amount of the second pre-injection IJ2 is set based on the engine load so that basically the higher the engine load, the greater the injection amount. Further, the injection amount of the second pre-injection IJ2 is set, based on the injection amount of the first pre-injection IJ1 set according to the engine speed, so that even it the engine speed changes, the total injection amount of the first pre-injection IJ1 and the second pre-injection IJ2 is constant. Therefore, the injection amount $Q_{ij2}$ of the second pre-injection IJ2 is, for example, set using a map similar to the map shown in FIG. 5B, based on the engine operation state. Hereinafter, the injection timing of the second pre-injection IJ2 set based on the engine operation state in this way is also referred to as the "basic injection timing of the second pre-injection IJ2".

Further, the second premixing time required for the equivalent ratio φ of almost all of the premixed gas formed by the second pre-injection IJ2 to be 1.0 to 2.0, becomes longer, as the injection amount of the second pre-injection IJ2 becomes greater. Further, to secure the second premixing time, the higher the engine speed, the more to the advanced side the second pre-injection. IJ2 must be performed. Therefore, the injection timing $T_{ij2}$ of the second pre-injection IJ2 is, for example, set using a map similar to the map shown in FIG. 5A, based on the engine operation state. Hereinafter, the injection timing of the second pre-injection IJ2 set based on the engine operation state in this way will also be referred to as the "basic injection timing of the second pre-injection IJ2".

<Problems at Time of Transient Operation>

When the internal combustion engine is in the middle of steady operation, by performing control based on the engine operation state as explained above, it is possible to control the injection timings and the injection amounts from the fuel injector 31 to suitable injection timings and injection amounts enabling suppression of combustion noise while raising the thermal efficiency. However, when the internal combustion engine is in the middle of transient operation, with only the above-mentioned such control, there is the problem that it is not possible to suitably control the injection timings and the injection amounts from the fuel injector 31. Below, referring to FIG. 7, this problem will be explained.

Note that, in this Description, the time when the internal combustion engine is in the middle of transient operation means the time when the engine operation state is changing and as a result of the engine operation state changing, other parameters relating to operation of the internal combustion engine (for example, supercharging pressure, EGR rate, etc.) are changing. Therefore, when the engine load increases and as a result the engine speed increases, the supercharging pressure increases, and the EGR rate changes, the internal combustion engine can be said to be in the middle of transient operation.

On the other hand, the time when the internal combustion engine is in the middle of steady operation, means the time when the engine operation state is maintained without change and the time when other parameters relating to operation of the internal combustion engine settle down without changing much at all. Therefore, when the engine load and engine speed are maintained substantially constant and the amounts of change per unit time of the supercharging pressure and the EGR rate are small amounts equal to or less than predetermined values, the internal combustion engine can be said to be in the middle of steady operation.

Figure 7:
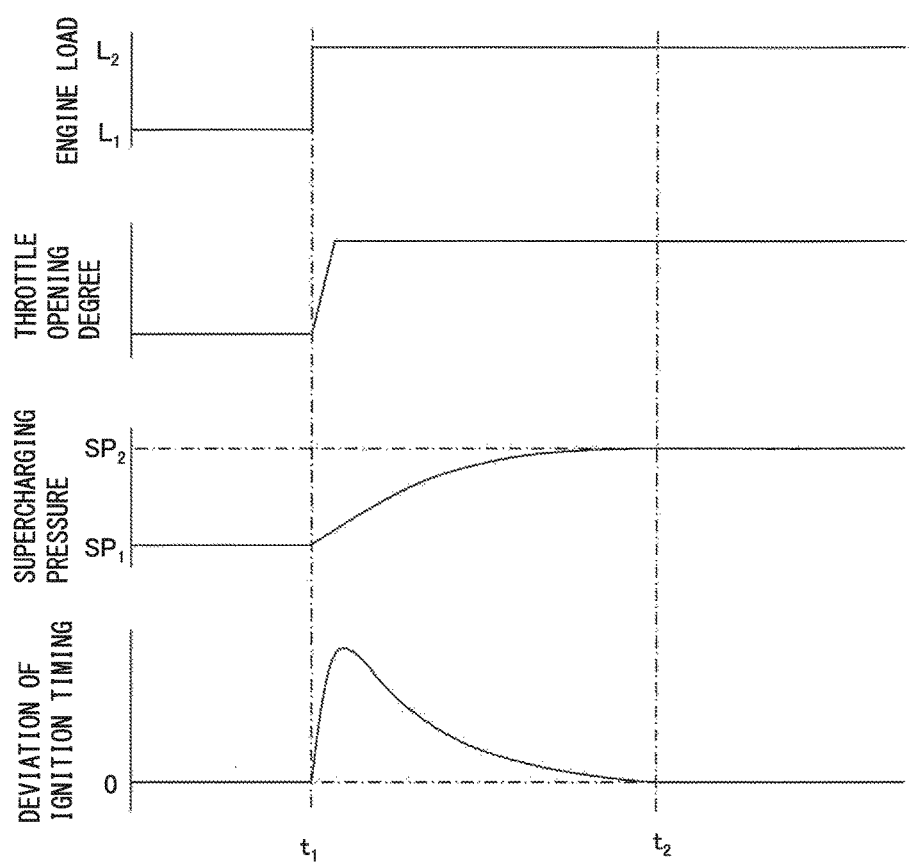
FIG. 7 is a time chart of a throttle opening degree, supercharging pressure, and deviation occurring in ignition timing, when an engine load changes.

FIG. 7 is a time chart of the throttle opening degree, supercharging pressure, and deviation occurring in ignition timing, when the engine load changes. The deviation occurring at the ignition timing shows the amount of deviation between the actual main injection self-ignition timing and the target main injection self-ignition timing.

In the example shown in FIG. 7, at the time $t_1$, the engine load is increased from $L_1$ to $L_2$ in steps. Along with this, at the time $t_1$, the throttle opening degree is increased. In addition, along with the increase in the engine load, the supercharging pressure also changes from the supercharging pressure $SP_1$ corresponding to the engine load $L_1$ to $SP_2$ corresponding to the engine load $L_2$. However, the reaction speed of the supercharging pressure is not that fast, and therefore time is taken from when the engine load increases to $L_2$ at the time $t_1$ to when the supercharging pressure reaches the supercharging pressure $SP_2$ corresponding to the engine load $L_2$ (in the illustrated example, reaches it at the time $t_2$).

On the other hand, as explained above, the injection timings and the injection amounts from the fuel injector 31 are set based on the engine operation state so that when the internal combustion engine is in the middle of steady operation, the main injection self-ignition timing becomes the target main injection self-ignition timing. Therefore, when a delay in the supercharging pressure causes the internal combustion engine to be in the middle of transient operation (time $t_1$ to time $t_2$ in the figure), the problem arises that the main injection self-ignition timing deviates from the target main in self-ignition timing. For this reason, when the internal combustion engine is in the middle of transient operation, it becomes necessary to correct the injection timings, etc., from the fuel injector 31 so that the main injection self-ignition timing becomes the target main injection self-ignition timing.

<Problems in Correction of Injection Timing>

In this regard, as explained above, in the present embodiment, the three fuel injections of the first pre-injection IJ1, the second pre-injection IJ2, and the main injection. IJM are performed. Therefore, when the internal combustion engine is in the middle of transient operation, in correcting the injection timings from the fuel injector 31, it is necessary to correct the injection timings of these three fuel injections. In correcting the injection timings of three fuel injections in this way, it may be considered to correct these injection timings across the board by a constant crank angle (or a constant time).

Figure 8:
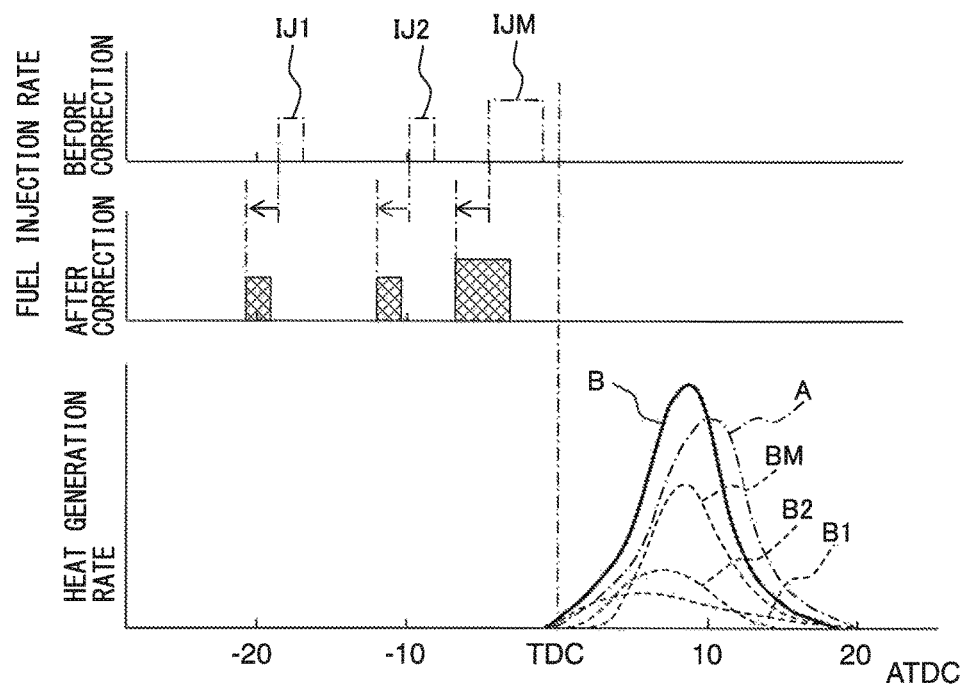
FIG. 8 is a view showing trends, with respect to crank angle, of fuel injection rates and heat generation rates by combustion in a combustion chamber, before and after correction of the injection timing.

FIG. 8 is a view showing the trends, with respect to crank angle, of the fuel injection rates and the heat generation rates by combustion in the combustion chambers, before and after correction of the injection timing. In the illustrated example, the case of correcting the three fuel injections of the first pre-injection IJ1, the second pre-injection IJ2, and the main injection IJM across the board by a certain crank angle to the advanced side, is shown. Further, in FIG. 8, the heat generation rate pattern A shows the heat generation rate pattern when injecting fuel at an injection timing before correction, while the heat generation rate pattern B shows the heat generation rate pattern when injecting fuel at an injection timing after correction.

In addition, the heat generation rate pattern B1 shows the trend in the heat generation rate due to combustion accompanying the first pre-injection IJ1 injected at the injection timing after correction, while the heat generation rate pattern B2 shows the trend in the heat generation rate due to combustion accompanying the second pre-injection IJ2 injected at the injection timing after correction, respectively. In addition, the heat generation rate pattern BM shows the trend in the heat generation rate due to combustion accompanying the main pre-injection IJM injected at the injection timing after correction.

As will be understood from FIG. 8, the heat generation rate pattern B has a larger peak value and a larger slope at the time of the rise of the heat generation rate, compared with the heat generation rate pattern A. Accordingly, in the heat generation rate pattern B, the combustion noise becomes larger than that in the heat generation rate pattern A.

On the other hand, when correcting the three fuel injections of the first pre-injection IJ1, the second pre-injection IJ2, and the main injection IJM across the board by a constant crank angle to the retarded side, a phenomenon reverse to the phenomenon shown in FIG. 8 occurs. In this case, the peak value of the heat generation rate pattern and the slope at the time of the rise of the heat generation rate are smaller and, accordingly, the combustion noise falls. However, the combustion itself within the combustion chambers 15 becomes slower and a drop in the thermal efficiency is invited.

From the above, if correcting the injection timings across the board by a constant crank angle, the combustion noise increases or a drop in the thermal efficiency is invited. Below, the reason why if correcting the injection timings of the three fuel injections across the board by a constant crank angle in this way, an increase in the combustion noise, etc., is invited, will be explained.

In this regard, as the equation for estimating the ignition delay time until fuel self-ignites, the Livengood-Wu integral equations are well known.

$$\left(\frac{1}{\tau}\right)_{P,T} = AP^n \exp\left(-\frac{E}{RT}\right) \quad (1)$$

$$\int_{t=0}^{t=te} \left(\frac{1}{\tau}\right)_{P,T} dt = 1 \quad (2)$$

$$\left(\frac{1}{\tau}\right)_{P,T} = A'P^b DO^c DF^d \exp\left(-\frac{E}{RT}\right) \quad (3)$$

$$\sum \left(\frac{1}{\tau}\right) = \int \left(\frac{1}{\tau}\right)_{P,T} dt \quad (4)$$

The above equation (1) and equation (2) are referred to as Livengood-Wu integral equations. The Livengood-Wu integral equations match the test values well. Note that, in equation (1), $\tau$ is the ignition delay time until self-ignition, A is the frequency factor, P is pressure ("n" is positive), E is the activation energy, R is the general gas constant, and T is the temperature. The left side of equation (1) shows the reciprocal ($1/\tau$) of the ignition delay time at the pressure P and the temperature T.

That is, if the temperature T becomes higher, the reaction speed (Arrhenius equation at right side) becomes faster, and therefore the ignition delay time $\tau$ becomes shorter, while if the pressure P becomes higher, the fuel density becomes higher, and therefore the ignition delay time $\tau$ becomes shorter. Therefore, the relation becomes as in equation (1). On the other hand, assuming that the state where the ignition delay time is τ has continued for the time dt, during this time dt, dt/τ in the time τ until self-ignition elapses. Therefore, when the state where the ignition delay time is τ1 continues for the time dt, the state where the ignition delay time is τ2 continues for the time dt, and then the state where the ignition delay time is $\tau_n$ continues for the time dt similarly, if the sum of dt/τ1, dt/τ2, . . . dt/τn . . . becomes 1, self-ignition occurs. Therefore, as shown in equation (2), when integrating by time the reciprocal (1/τ) of the ignition delay time at the pressure P and temperature T, the time $t_e$ when the integral becomes 1 becomes the ignition delay time τ.

Equation (3) shows an equation often used as an equation showing the reciprocal (1/τ) of the ignition delay time when considering also other factors actually having an influence other than the pressure P and temperature T in an internal combustion engine of the self-ignition type using diesel oil. Note that, in the above equation (3), DO indicates the oxygen density, DF the fuel density, and A', "b", "c", and "d" identification constants. The other abbreviations are similar to those in equation (1). Note that, in the present embodiment, the time integral of equation (3) is expressed by Σ (1/τ) as shown in equation (4). From equation (3), it will be understood that the higher the pressure P, the shorter the ignition delay time τ, and the higher the temperature T, the shorter the ignition delay time τ, and the higher the oxygen density DO, the shorter the ignition delay time τ.

Figure 9:
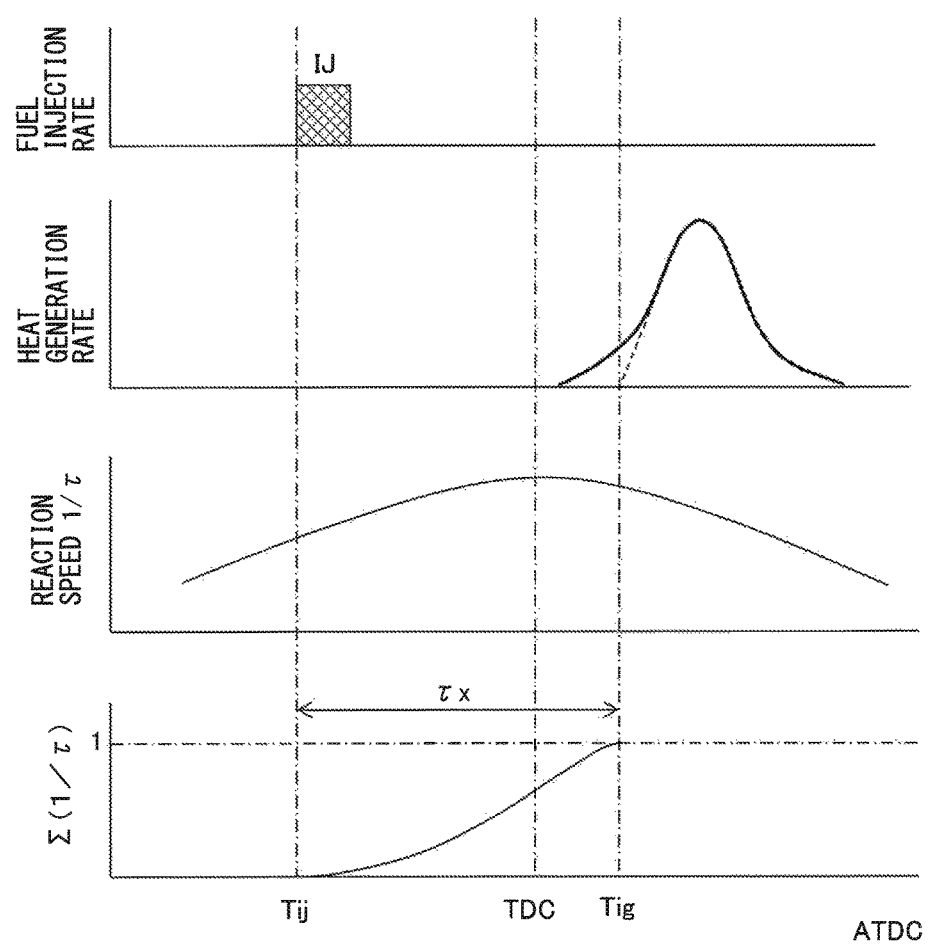
FIG. 9 is a view showing trends in a fuel injection rate, heat generation rate, reaction speed, and time integral.

The concepts of the injection timing from the fuel injector 31, the self-ignition timing, and the ignition delay time based on the method of estimation using the above equation (2) and equation (3), will be explained using FIG. 9. FIG. 9 is a view showing the trends in the fuel injection rate, heat generation rate, reaction speed 1/τ, and time integral. FIG. 9 shows the case where the fuel injection. IJ from the fuel injectors 31 is performed only once.

According to the above equation (3), the reciprocal (1/τ) of the ignition delay time (hereinafter, referred to as the "reaction speed") changes in accordance with the temperature, pressure, and oxygen density in the combustion chambers 15. Therefore, the reaction speed (1/τ), as shown in FIG. 9, gradually rises toward compression TDC, becomes maximum at compression TDC, then gradually falls as the crank angle is further from the compression TDC.

In the example shown in FIG. 9, fuel injection IJ from the fuel injectors 31 is started at the injection timing Tij. As explained above, in calculation of the ignition delay time τ using equation (2) and equation (3), the reaction time (1/τ) starts to be integrated after fuel is injected from the fuel injectors 31. For this reason, after the injection timing Tij, the value of the Σ (1/τ) is gradually increased.

If the value of Σ (1/τ) gradually increases, the value of Σ (1/τ) finally reaches 1. At the timing Tig where Σ (1/τ) reaches 1 in this way, the premixed gas formed by the fuel injection IJ self-ignites. Further, the ignition delay time τx at this time means the time period from starting to cumulatively add Σ (1/τ) to when Σ (1/τ) becomes 1, that is, the time period from the injection timing Tij to the ignition timing Tig.

Figure 10:
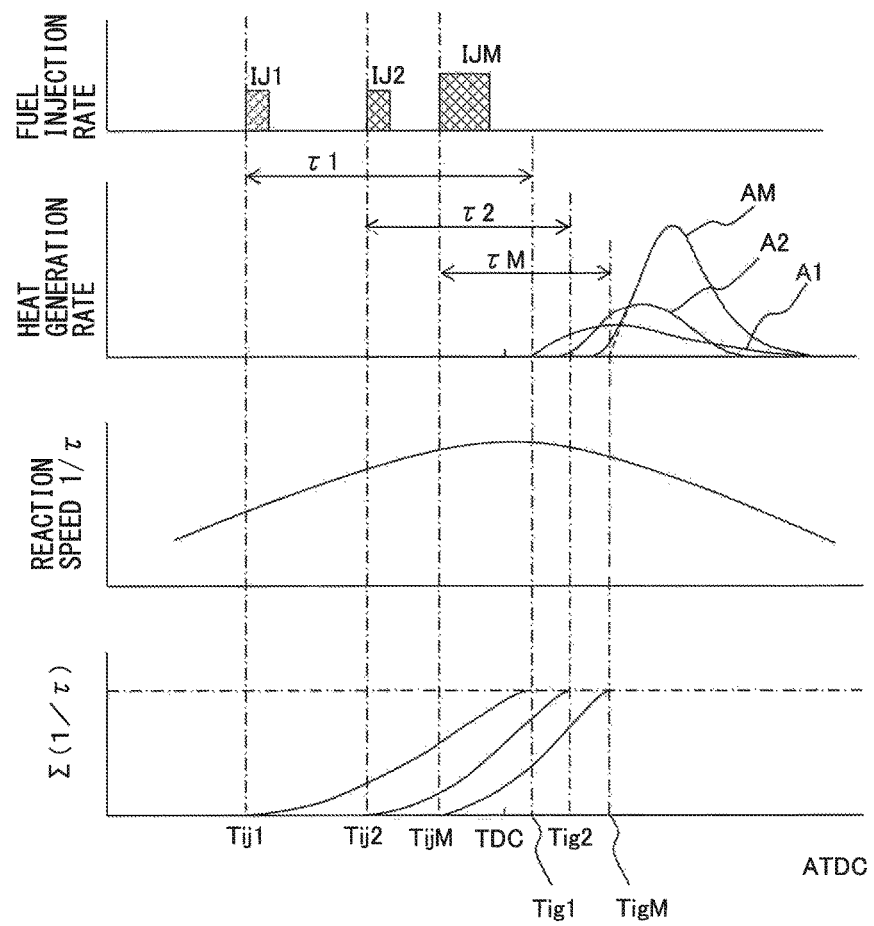
FIG. 10 is a view similar to FIG. 9, in the case where a fuel injector injects fuels a plurality of times.

Next, referring to FIG. 10, the case where the fuel injectors 31, as explained above, inject fuel three times in two pre-injections IJ1 and IJ2 and a main injection IJM, will be explained. FIG. 10 is a view similar to FIG. 9 in the case where the fuel injectors 31 inject fuel a plurality of times.

In this regard, in the present embodiment, the fuel injections from the fuel injectors 31 are controlled so that the premixes formed by the pre-injections burn by compression self-ignition after the start of main injection. Therefore, until the start of the main injection IJM, no heat is generated inside the combustion chambers 15. Further, even if the premixes formed by the pre-injections IJ1 and IJ2 self-ignite before self-ignition of the premixed gas formed by the main injection IJM, the heat generation rate at the start of the self-ignition does not become that large. Therefore, as explained above, even if performing three fuel injections of the two pre-injections IJ1 and IJ2 and main injection IJM, logic similar to the logic explained using FIG. 8 generally stands.

Therefore, the premixed gas formed by the first pre-injection IJ1 self-ignites at Tig1 where the integral Σ (1/τ) of the reaction speed (1/τ) from the injection timing Tij1 of the first pre-injection IJ1 becomes 1. Further, the premixed gas formed by the second pre-injection IJ2 self-ignites at Tig2 where the integral Σ (1/τ) of the reaction speed (1/τ) from the injection timing Tij2 of the second pre-injection IJ2 becomes 1. Furthermore, the premixed gas formed by the main injection IJM self-ignites at TigM where the integral Σ (1/τ) of the reaction speed (1/τ) from the injection timing TijM of the main injection IJM becomes 1.

Note that, near the injection timing Tij1 of the first pre-injection IJ1, the reaction speed (1/τ) is relatively small and, accordingly, the speed of increase of Σ (1/τ) right after injection is slow. On the other hand, near the injection timing TijM of the main injection IJM, the reaction speed (1/τ) is a relatively large value and, accordingly, the speed of increase of Σ (1/τ) right after injection is fast. As a result, the ignition delay time from injection timing Tij1 of the first pre-injection IJ1 to the ignition timing Tig1 is longer than the ignition delay time from the injection timing TijM of the main injection IJM to the ignition. timing TigM.

Figure 11:
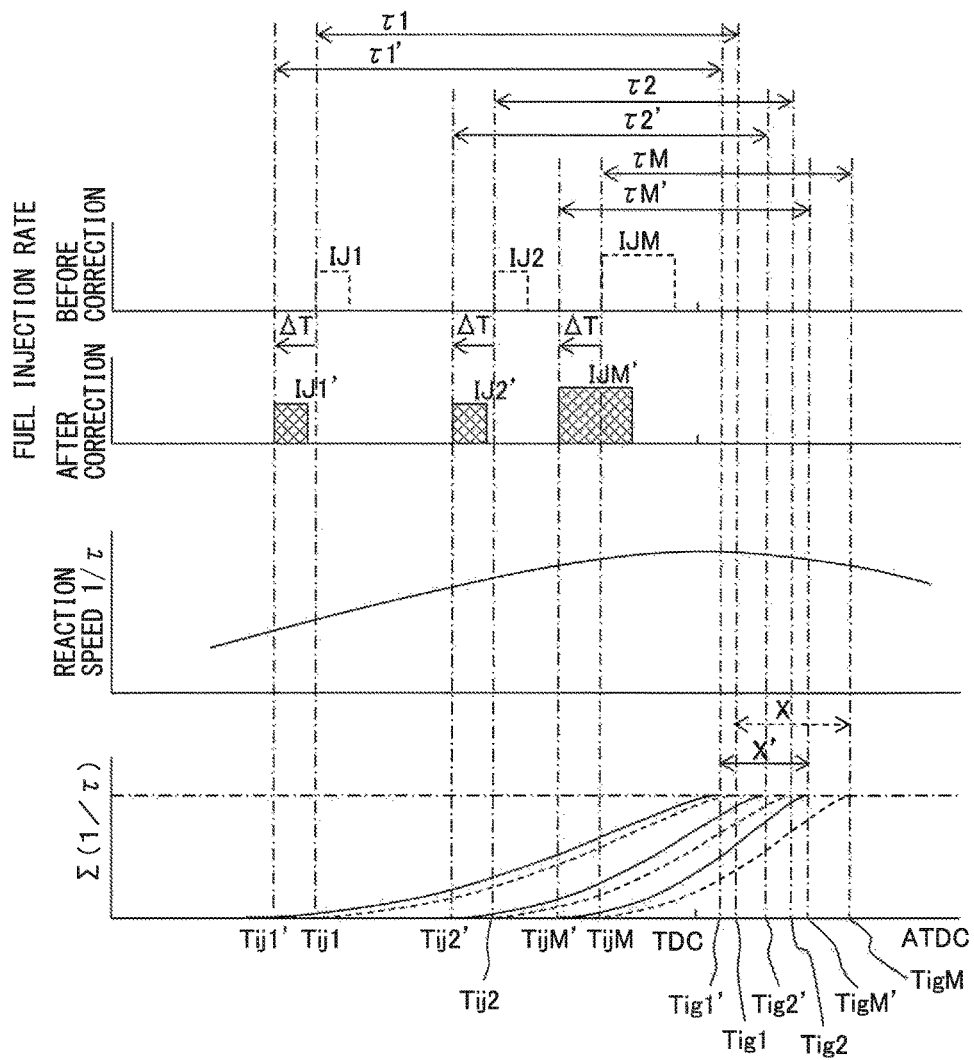
FIG. 11 is a view similar to FIG. 10, in the case of correcting injection timings of three fuel injections across the board by a constant crank angle.

Based on the above logic and referring to FIG. 11, the case of correcting the injection timings of the three fuel injections across the board by a constant crank angle will be considered. FIG. 11 is a view similar to FIG. 10, in the case of correcting the injection timings of the three fuel injections across the board by a constant crank angle. In FIG. 11, the trends in the integral Σ (1/τ) when performing the three fuel injections at injection timings similar to the injection timings shown in FIG. 10 are shown by the broken lines. In addition, the trends in the integral Σ (1/τ) when correcting the injection timings of the three fuel injections from the injection timings similar to the injection timings shown in FIG. 10 across the board by the constant crank angle ΔT are shown by the solid lines.

As will be understood from FIG. 11, the ignition delay time τ1' of the premixed gas formed by the first pre-injection IJ1 after correction becomes considerably longer than the ignition delay time τ1 of the premixed gas formed by the first pre-injection IJ1 before correction. This is because the injection timing Tij1 of the first pre-injection IJ1 is separated from compression TDC and, near the injection timing Tij1, the reaction speed (1/τ) becomes relatively small. As a result, the integral. Σ (1/τ) from Tij1' to Tij1 is small. Even if changing the injection timing from Tij1 to Tij1', the timing at which the integral Σ (1/τ) reaches 1 does not change much at all. Accordingly, the amount of change of the ignition timing (Tig1'-Tig1) is considerably smaller than the amount of change ΔT of the injection timing. For this reason, the ignition delay time τ1' after correction of the injection timings becomes considerably longer than the ignition delay time τ1 before correction of the injection timings.

On the other hand, the ignition delay time τM' of the premixed gas formed by the main injection IJM after correction is substantially equal to the ignition delay time τM of the premixed gas formed by the main injection IJM before correction. This is because the injection timing TijM of the main injection IJM is close to compression TDC and, near the injection timing TijM, the reaction speed ($1/\tau$) is large. As a result, the integral $\Sigma$ ($1/\tau$) from TijM' to TijM is large. If changing the injection timing from TijM to TijM', the timing at which the integral $\Sigma$ ($1/\tau$) reaches 1 greatly changes. Accordingly, the amount of change of the ignition timing (TigM'-TigM) is the same extent as the amount of change $\Delta T$ of the injection timing. For this reason, the ignition delay time $\tau M'$ after correction of the injection timings is substantially equal to the ignition delay time $\tau M$ before correction of the injection timings.

Further, as will be understood from FIG. 11, for the second pre-injection, the amount of change of the ignition timing (Tig2'-Tig2) is somewhat smaller than the amount of change of the injection timing $\Delta T$. For this reason, for the second pre-injection, the ignition delay time $\tau 2'$ after correction of the injection timing becomes somewhat longer than the ignition delay time $\tau 2$ before correction of the injection timing.

As a result, if calling the time period from the ignition timing of the premixed gas formed by the first pre-injection to the ignition timing of the premixed gas formed by the main injection the "ignition deviation time period", the ignition deviation time period X' after correction of the injection timings is shorter than the ignition deviation period X before correction of the injection timings. That is, if injecting fuel at injection timings after correction, the pre-mixes formed by the two pre-injections IJ1 and IJ2 and the main injection IJM self-ignite within a short time period. As a result, the heat generation rate patterns B1, B2, and BM shown in FIG. 8 no longer become dispersed, the heat generation rate pattern B formed by the addition of these patterns is larger in peak value and slope at time of rise of the heat generation rate, and, accordingly, the combustion noise increases.

Note that, in the example shown in FIG. 11, the case of advancing the injection timings of the fuel injections across the board by $\Delta T$ was shown. However, if performing correction retarding the injection timings of the fuel injections across the board by $\Delta T$, a phenomenon opposite to the case shown in FIG. 11 arises. In this case, after correction of the injection timings, compared with before correction of the injection timings, the ignition timings of the premixes formed by the injections change in a direction away from each other. As a result, combustion in the combustion chambers 15 becomes slower and a drop in thermal efficiency is invited.

Therefore, when correcting the injection timings of the fuel injections in the middle of transient operation of the internal combustion engine, to keep down combustion noise and keep the combustion from becoming slow, it becomes necessary to prevent the integral between self-ignition timings of the premixes formed by injections from changing before and after correction.

<Correction Control of Injection Timing in Present Embodiment>

Figure 12:
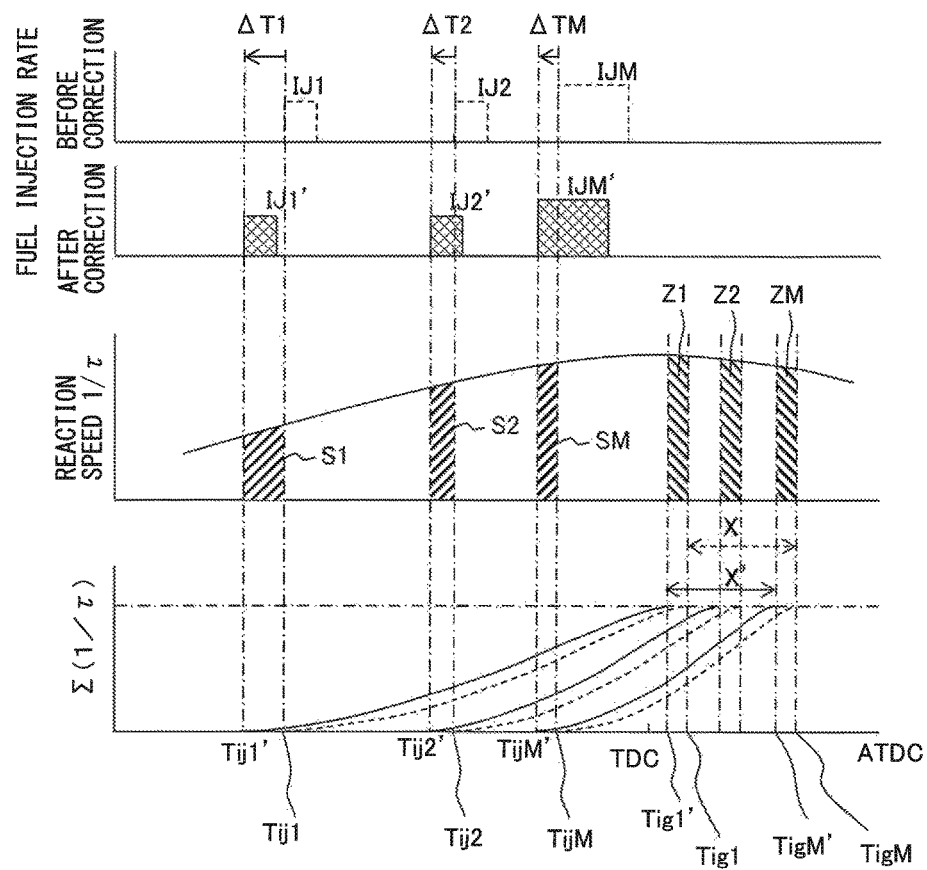
FIG. 12 is a view similar to FIG. 11, in the case of correcting injection timings of three fuel injections by correction control of the first embodiment.

Next, referring to FIG. 12, correction control for correcting the injection timings of fuel injections from the basic injection timing when the internal combustion. engine is in the middle of transient operation, will be explained. FIG. 12 is a view similar to FIG. 11, in the case of correcting the injection timings of the three fuel injections by the correction control of the present embodiment.

In this regard, if considering the first pre-injection IJ1 as an example, in the example shown in FIG. 12, if performing the first pre-injection at the injection timing Tij1, the ignition timing of the premixed gas formed by the first pre-injection IJ1 is Tig1. On the other hand, if correcting the injection timing of the first pre-injection IJ1 to perform the first pre-injection. IJ1' at the injection timing Tj1', the ignition timing of the premixed gas formed by the first pre-injection IJ1' is Tig1'. In this regard, the integral $\Sigma$ ($1/\tau$) of the reaction speed from the injection timing Tij1 to the ignition timing Tig1 before correction is 1, while the integral $\Sigma$ ($1/\tau$) of the reaction speed from the injection timing Tij1' to the ignition timing Tig1' after correction is also 1. Therefore, the integral $\Sigma$ ($1/\tau$) of the reaction speed from the injection timing Tij1' after correction to the injection timing Tij1 before correction (corresponding to area S1 of FIG. 12) is equal to the integral $\Sigma$ ($1/\tau$) of the reaction speed from the ignition timing Tig1' to the ignition timing Tig1 (corresponding to area Z1 of FIG. 12).

Conversely speaking, to correct the ignition timing of the premixed gas formed by the first pre-injection IJ1 from Tig1 to Tig1', it is sufficient to correct the injection timing of the first pre-injection IJ1 so that the area Z1 and the area S1 become equal. Similarly, to correct the ignition timing of the premixed gas formed by the second pre-injection IJ2 from Tig2 to Tig2', it is sufficient to correct the injection timing of the second pre-injection IJ2 so that the area Z2 and area S2 in the figure become equal. Further, to correct the ignition timing of the premixed gas formed by the main injection IJM from TigM to TigM', it is sufficient to correct the injection timing of the main injection IJM so that the area ZM and area SM in the figure become equal.

In this regard, as explained above, when performing the first pre-injection, the second pre-injection, and the main injection, the ignition timings of the premixes formed by these injections fall within a short time period. Further, the ignition timings of the premixes formed by these injections are close to compression TDC, and therefore near the ignition timings, the reaction speed $1/\tau$ does not change that much. Therefore, when desiring to equally change the ignition timings of the first pre-injection, the second pre-injection, and the main injection, the areas Z1, Z2, and ZM of FIG. 12 should be substantially equal.

Therefore, in the correction control of the present embodiment, when shifting the ignition timing of the main injection IJM from TigM to TigM', the injection timing of the main injection is corrected so that the integral $\Sigma$ ($1/\tau$) of the reaction speed from the injection timing of the main injection TigM' after correction to the injection timing of the main injection TigM before correction (corresponding to area SM in the figure) is equal to the integral $\Sigma$ ($1/\tau$) of the reaction speed from TigM' to TigM (corresponding to area ZM in the figure). Similarly, in the correction control of the present embodiment, in such a case, the injection timing of the first pre-injection is corrected so that the integral $\Sigma$ ($1/\tau$) of the reaction speed from the injection timing of the first pre-injection Tij1' after correction to the injection timing of the first pre-injection Tij1 before correction (corresponding to area S1 in the figure) is equal to the integral $\Sigma$ ($1/\tau$) of the reaction speed from TigM' to TigM (corresponding to area ZM in the figure). In addition, in correction control of the present embodiment, in such a case, the injection timing of the second pre-injection is corrected so that the integral $\Sigma$ ($1/\tau$) of the reaction speed from the injection timing Tij2' of the second pre-injection after correction to the injection timing of the second pre-injection before correction (corresponding to are S2 in the figure) is equal to the integral $\Sigma$ ($1/\tau$) of the reaction speed from TigM' to TigM (corresponding to area ZM in figure).

In this regard, as explained above, the reaction speed ($1/\tau$) becomes largest at compression TDC and becomes smaller as separated further from compression TDC. As a result, when making the areas S1, S2, and SM all equal to the area ZM, inevitably the amount of correction of the injection timing of the first pre-injection separated the most from compression TDC is the largest and the amount of correction of the injection timing of the main injection closest to compression TDC is smallest. Therefore, in the present embodiment, correction of the injection timings of the injections is controlled so that the larger the crank angle from compression TDC of the injection timings before correction, the larger the amounts of correction of the injection timings of the injections.

Figure 13A:
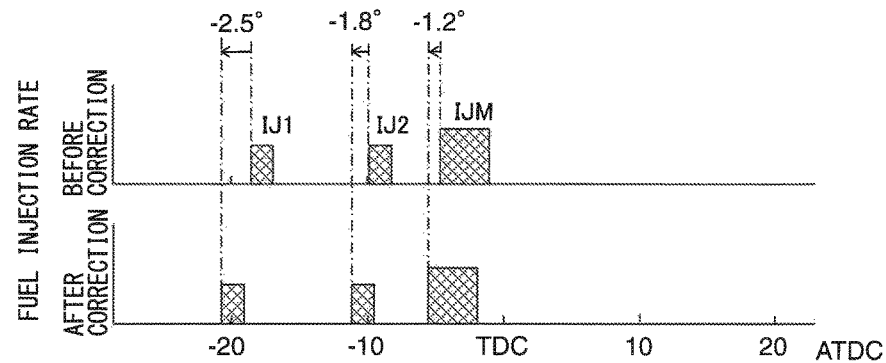
FIG. 13A is a view showing trends, with respect to crank angle, of fuel injection rates from a fuel injector before and after correction by correction control.
Figure 13B:
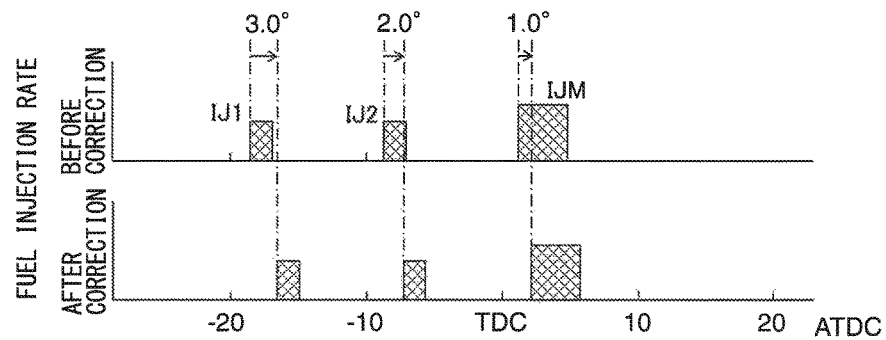
FIG. 13B is a view showing trends, with respect to crank angle, of fuel injection rates from a fuel injector before and after correction by correction control.
Figure 13C:
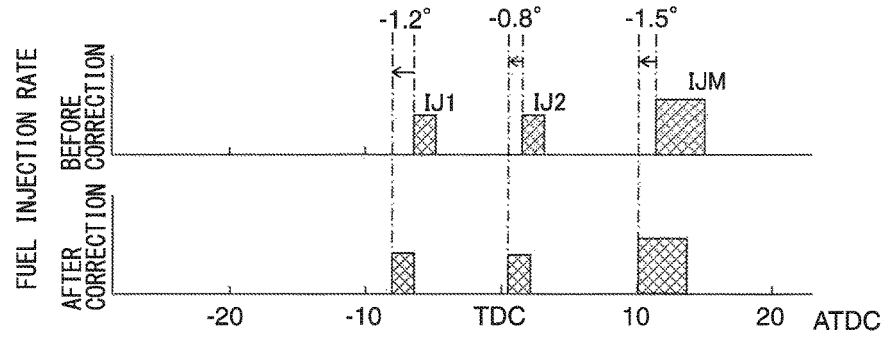
FIG. 13C is a view showing trends, with respect to crank angle, of fuel injection rates from a fuel injector before and after correction by correction control.

Such correction control will be explained in more detail while referring to FIG. 13A to FIG. 13C. FIG. 13A to FIG. 13C are views showing trends, with respect to crank angle, in the fuel injection rate from the fuel injectors 31 before and after correction by the above-mentioned correction control.

FIG. 13A shows the case where the first pre-injection IJ1, the second pre-injection IJ2, and the main injection IJM are performed by similar injection timings as the above-mentioned embodiment. Therefore, the first pre-injection IJ1, the second pre-injection IJ2, and the main injection IJM are all performed before compression TDC. For this reason, as explained above, in correction control, the amount of correction of the injection timing of the first pre-injection IJ1 separated the most from compression TDC is largest, and the amount of correction of the injection timing of the main injection IJM closest to compression TDC is the smallest.

FIG. 13B shows an example where the first pre-injection IJ1 and the second pre-injection IJ2 are performed before compression TDC, but the main injection IJM is performed after compression TDC. In particular, FIG. 13B shows the case where the injection timing of the first pre-injection IJ1 before correction is −18° ATDC or so, the injection timing of the second pre-injection IJ2 before correction is −9° ATDC or so, and the injection timing of the main injection IJM before correction is 1° ATDC or so.

In the case such as shown in FIG. 13B, the crank angle from compression TDC is larger in the order of the main injection IJM, the second pre-injection IJ2, and the first pre-injection. For this reason, in this case, in correction control, the amount of correction of the injection timing of the first pre-injection IJ1 separated the most from compression TDC is the largest, while the amount of correction of the injection timing of the main injection IJM closest to compression TDC is the smallest.

FIG. 13C shows an example where the first pre-injection IJ1 is performed before compression. TDC, but the second pre-injection IJ2 and the main injection IJM are performed after compression TDC. In particular, FIG. 13C shows the case where the injection timing of the first pre-injection IJ1 before correction is −7° ATDC or so, the injection timing of the second pre-injection IJ2 before correction is 1° ATDC or so, and the injection timing of the main injection IJM before correction is 10° ATDC or so.

In the case such as shown in FIG. 13C, the crank angle from compression TDC is larger in the order of the second pre-injection IJ2, the first pre-injection, and the main in IJM. For this reason, in this case, in correction control, the amount of correction of the injection timing of the main injection IJM separated the most from compression TDC is the largest, while the amount of correction of the in timing of the second pre-injection IJ2 closest to compression TDC is the smallest.

By performing correction control of the injection timings of the injections in this way, it is possible to prevent the intervals between self-ignition timings of the premixes formed by the injections from changing much at all before and after correction. As a result, due to correction of the injection timings, it is possible to keep the combustion noise from becoming larger and combustion from becoming slower.

Note that, in the present embodiment, at each cycle, three injections of the first pre-injection, second pre-injection, and third pre-injection are performed. However, the number of fuel injections from the fuel injectors 31 in each cycle is not necessarily three times. The number may be four or more so long as including two pre-injections and one main injection. In this way, even when four or more fuel injections are performed, in the correction control, the injection timings of the injections are corrected so that the larger the crank angle from compression TDC of the injection timings before correction, the larger the amounts of correction of the injection timings of the injections.

<Correction Control in Middle of Transient Operation>

In this regard, when the internal combustion engine is in the middle of steady operation, the pressure Ptdc in the combustion chambers 14 at compression TDC (compression end pressure), the temperature Ttdc in the combustion chambers 15 at compression TDC (compression end temperature), and the oxygen density DO, settle to constant values according to the engine operation state. Below, the values at which the compression end pressure Ptdc, compression end temperature Ttdc, and oxygen density DO when the internal combustion engine is in the middle of steady operation are respectively referred to as the "basic pressure Pb", "basic temperature Tb", and "basic oxygen density DOb". Therefore, these basic pressure Pb, basic temperature Tb, and basic oxygen density DOb are values determined based on the engine operation state.

On the other hand, when the internal combustion engine is in the middle of transient operation, even if the engine operation state is a certain engine operation state, the compression end pressure Ptdc, compression end temperature Ttdc, and oxygen density DO are different from the basic pressure Pb, basic temperature Tb, and basic oxygen density DOb corresponding to that certain engine operation state. In this regard, as shown in the above equation (3), the reaction speed ($1/\tau$) changes according to the pressure P, temperature T, and oxygen density DO in the combustion chamber 15. For this reason, if the compression end pressure Ptdc, compression end temperature Ttdc, and oxygen density DO deviate from the basic pressure Pb, basic temperature Tb, and basic oxygen density DOb, along with this, the reaction speed ($1/\tau$) changes and, as a result, the timing when the integral value $\Sigma$ of the reaction speed reaches 1, that is, the ignition timing, changes.

Specifically, if the compression end pressure Ptdc becomes higher than the basic pressure Pb, the reaction speed ($1/\tau$) becomes faster and accordingly the ignition timing is advanced. Conversely, if the compression end pressure Ptdc becomes lower than the basic pressure Pb, the reaction speed ($1/\tau$) becomes slower and accordingly the ignition timing is retarded. Further, if the compression end temperature Ttdc becomes higher than the basic temperature Tb, the reaction speed ($1/\tau$) becomes faster and accordingly the ignition timing is advanced. Conversely, if the compression end temperature Ttdc becomes lower than the basic temperature Tb, the reaction speed ($1/\tau$) becomes retarded and accordingly the ignition timing is retarded. Furthermore, if the oxygen density DO becomes higher than the basic oxygen density DOb, the reaction speed (1/τ) becomes faster and accordingly the ignition timing is advanced. Conversely, if the oxygen density DO becomes lower than the basic oxygen density DOb, the reaction speed (1/τ) becomes slower and accordingly the ignition timing is retarded.

Therefore, in the present embodiment, the basic pressure Pb, basic temperature Tb, and basic oxygen density DOb are calculated based on the current engine operation state. In addition, in the present embodiment, the compression end pressure Ptdc is estimated based on the pressure of the intake gas detected or estimated by the intake pressure detection part of the control device 70, while the compression end temperature Ttdc is estimated based on the temperature of the intake gas detected or estimated by the intake temperature detection part. Furthermore, the oxygen density of the intake gas is estimated or detected by the oxygen density detection part of the control device 70.

Figure 14:
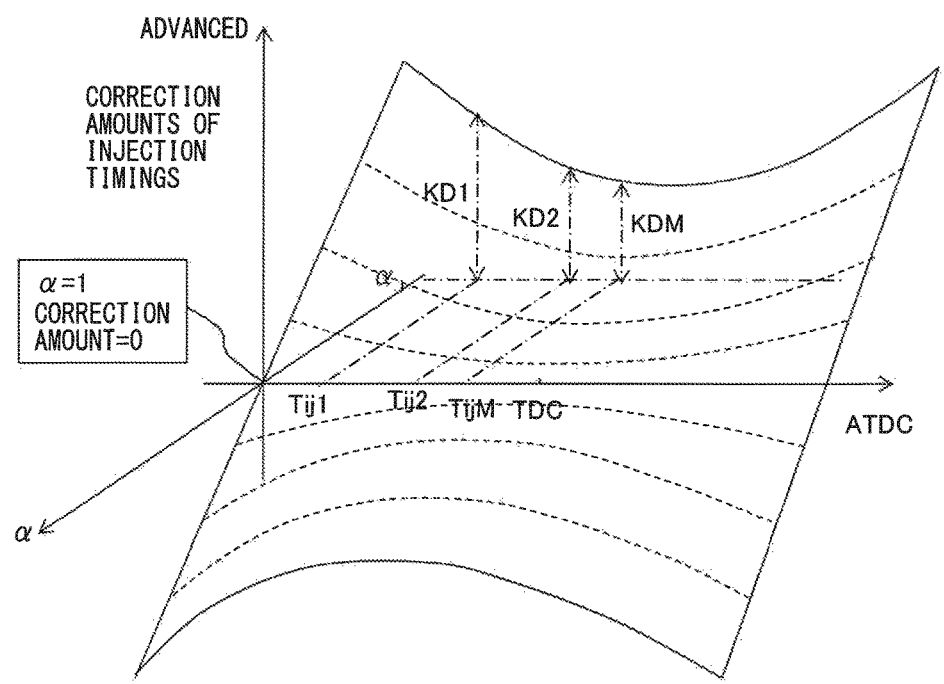
FIG. 14 is a map for correcting an injection timing according to pressure.

Further, in the present embodiment, based on the pressure ratio α of the current compression end pressure Ptdc with respect to the basic pressure Pb (=Ptdc/Pb), the amounts of correction of the injection timings of the injections are calculated by using a map such as shown in FIG. 14. As will be understood from FIG. 14, the larger the pressure ratio α, the more the injection timings of the injections are corrected to the retarded side. Therefore, the higher the current compression end pressure Ptdc, the more the injection timings of the injections are corrected to retarded side injection timings. Further, as explained above, the further the crank angle from compression TDC, the larger the amounts of correction of the injection timings of the injections.

Therefore, for example, in the example shown in FIG. 14, when the pressure ratio of the current compression end pressure Ptdc with respect to the basic pressure Pb is $α_1$, the injection timing of the first pre-injection IJ1 with a basic injection timing of Tij1 is advanced by the correction amount KD1. Similarly, the injection timing of the second pre-injection IJ2 with a basic injection timing of Tij2 is advanced by the correction amount KD2. In addition, the injection timing of the main injection IJM with a basic injection timing of TijM is advanced by the correction amount KDM.

Note that, in the present embodiment, the injection timings of the injections are corrected based on the compression end pressure Ptdc and the compression end pressure when the internal combustion engine is the middle of steady operation, that is, the basic pressure Pb. However, for example, if considering the fact that the compression end pressure changes according to the pressure of the intake gas supplied to the combustion chambers 15 (hereinafter, referred to as "intake pressure"), the injection timings of the injections may also be corrected based on the intake pressure and the basic pressure corresponding to this.

Figure 15:
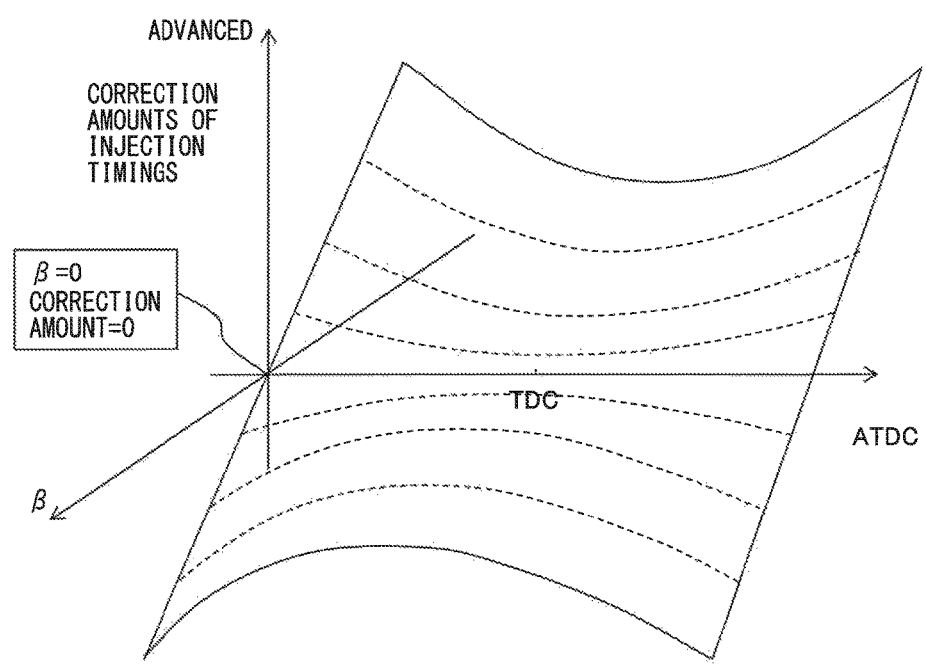
FIG. 15 is a map for correcting an injection timing according to temperature.

Further, in the present embodiment, based on the temperature difference β of the current compression end temperature Ttdc with respect to the basic temperature Tb (=Ttdc−Tb), the amounts of correction of the injection timings of the injections are calculated by using a map such as shown in FIG. 15. As will be understood from FIG. 15, the larger the temperature difference β, the more to the retarded side the injection timings of the injections are corrected to. Therefore, the higher the current compression end temperature Ttdc, the more the injection timings of the injections are corrected to retarded side injection timings. Further, as explained above, the further the crank angle from the compression TDC, the larger the amounts of correction of the injection timings of the injections.

Note that, in the present embodiment, the injection timings of the injections are corrected based on the compression end temperature Ttdc and the compression end temperature when the internal combustion engine is the middle of steady operation, that is, the basic temperature Tb. However, for example, if considering the fact that the compression end temperature changes in accordance with the temperature of the intake gas supplied to the combustion chambers 15 (hereinafter, referred to as the "intake temperature"), the injection timings of the injections may also be corrected based on the intake temperature and the basic pressure corresponding to the same.

Figure 16:
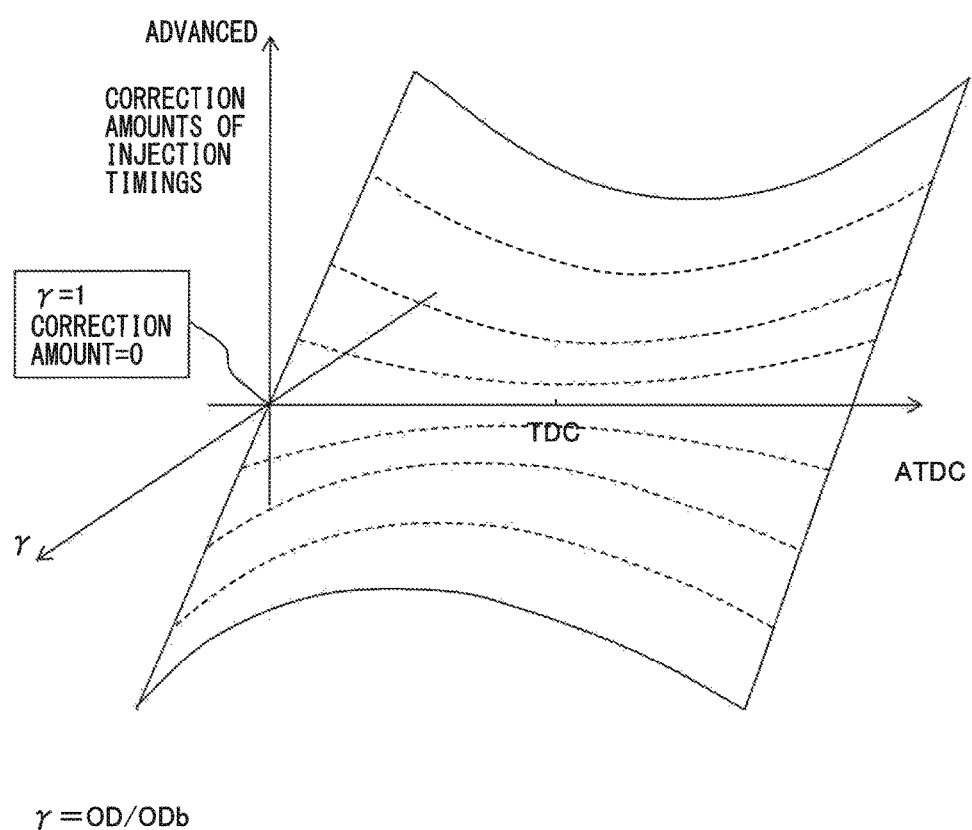
FIG. 16 is a map for correcting an injection timing according to oxygen density.

Further, in the present embodiment, based on the density ratio γ of the current oxygen density DO with respect to the basic oxygen density DOb (=DO/DOb), the amounts of correction of the injection timings of the injections are calculated by using a map such as shown in FIG. 16. As will be understood from FIG. 16, the larger the density ratio γ, the more to the retarded side the injection timings of the injections are corrected to. Therefore, the higher the current oxygen density DO, the more the injection timings of the injections are corrected to retarded side injection timings. Further, the further the crank angle from compression TDC, the larger the amounts of correction of the injection timings of the injections.

Note that, in the present embodiment, the injection timings of the injections are corrected based on the oxygen density DO and the basic oxygen density DOb when the internal combustion engine is in the middle of steady operation. However, if considering the fact that the oxygen density for example changes according to the EGR rate of the intake gas supplied to the combustion chambers 15 of the cylinders 11 or the amount of oxygen in the intake gas, the injection timings of the injections may be corrected based on the EGR rate and amount of oxygen, and the basic EGR rate and basic amount of oxygen corresponding to the same.

<Flow Chart>

Figure 17:
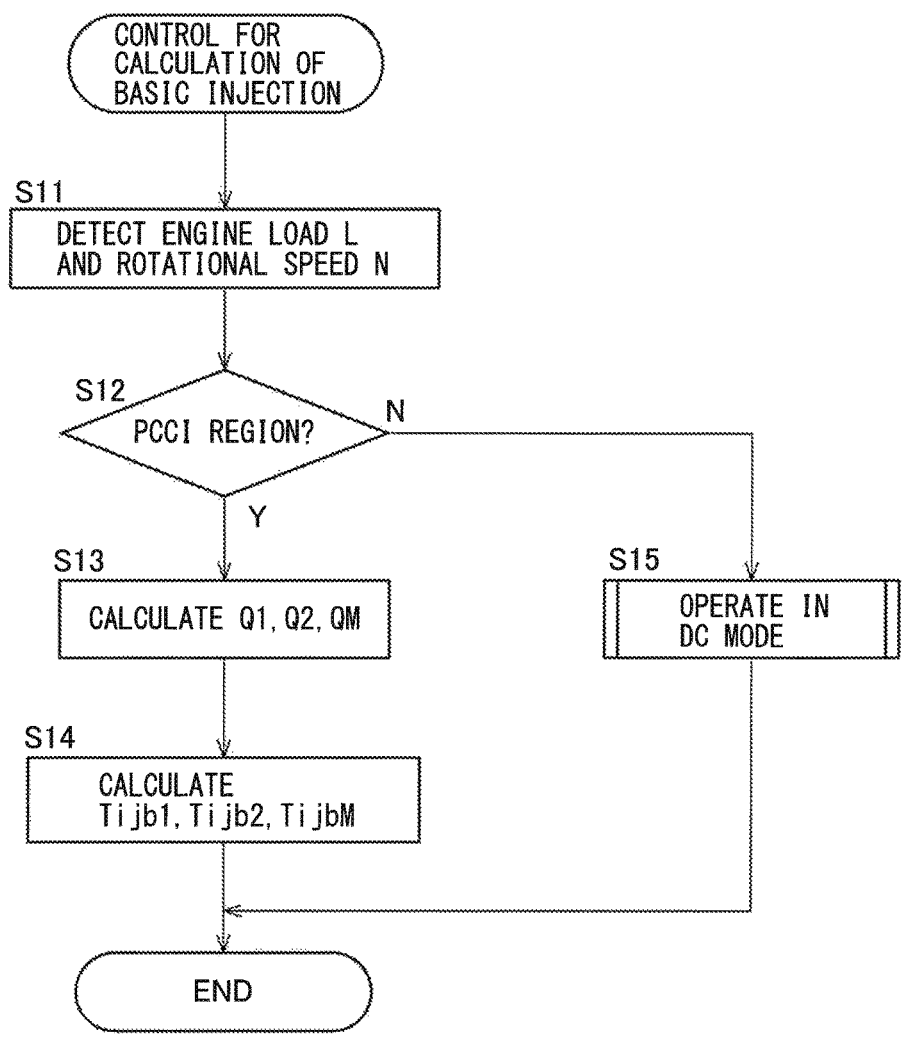
FIG. 17 is a flow chart showing a control routine for basic fuel injection calculation control for calculating a basic injection timing and a basic injection amount.

FIG. 17 is a flow chart showing a control routine of basic fuel injection calculation control for calculating the basic injection timing and the basic injection amount. The illustrated control routine is performed by interruption at certain time intervals.

Referring to FIG. 17, first, at step S11, the engine load L is detected by the load sensor 88 and the engine speed N is calculated based on the crank angle sensor 89. That is, at step S11, the current engine operation state is calculated.

Next, at step S12, a map such as shown in FIG. 3 is used to judge if the current engine operation state calculated at step S11 is within the PCCI region. If it is judged that the current engine operation state is within the PCCI region, the routine proceeds to step S13. At step S13, a map such as shown in FIG. 5B is used to calculate the injection amount Qij1 of the first pre-injection IJ1, the injection amount Qij2 of the second pre-injection IJ2, and the injection amount QijM of the main injection IJM from the current engine operation state.

Next, at step S14, a map such as shown in FIG. 5A is used to calculate the basic injection timing Tijb1 of the first pre-injection IJ1, the basic injection timing Tijb2 of the second pre-injection IJ2, and the basic injection timing TijbM of the main injection. IJM from the current engine operation state, then the control routine is ended. On the other hand, when at step S12 it is judged that the engine operation state is not within the PCCI region, the routine proceeds to step S15. At step S15, the internal combustion engine is operated by the DC mode, then the control routine is ended.

Figure 18:
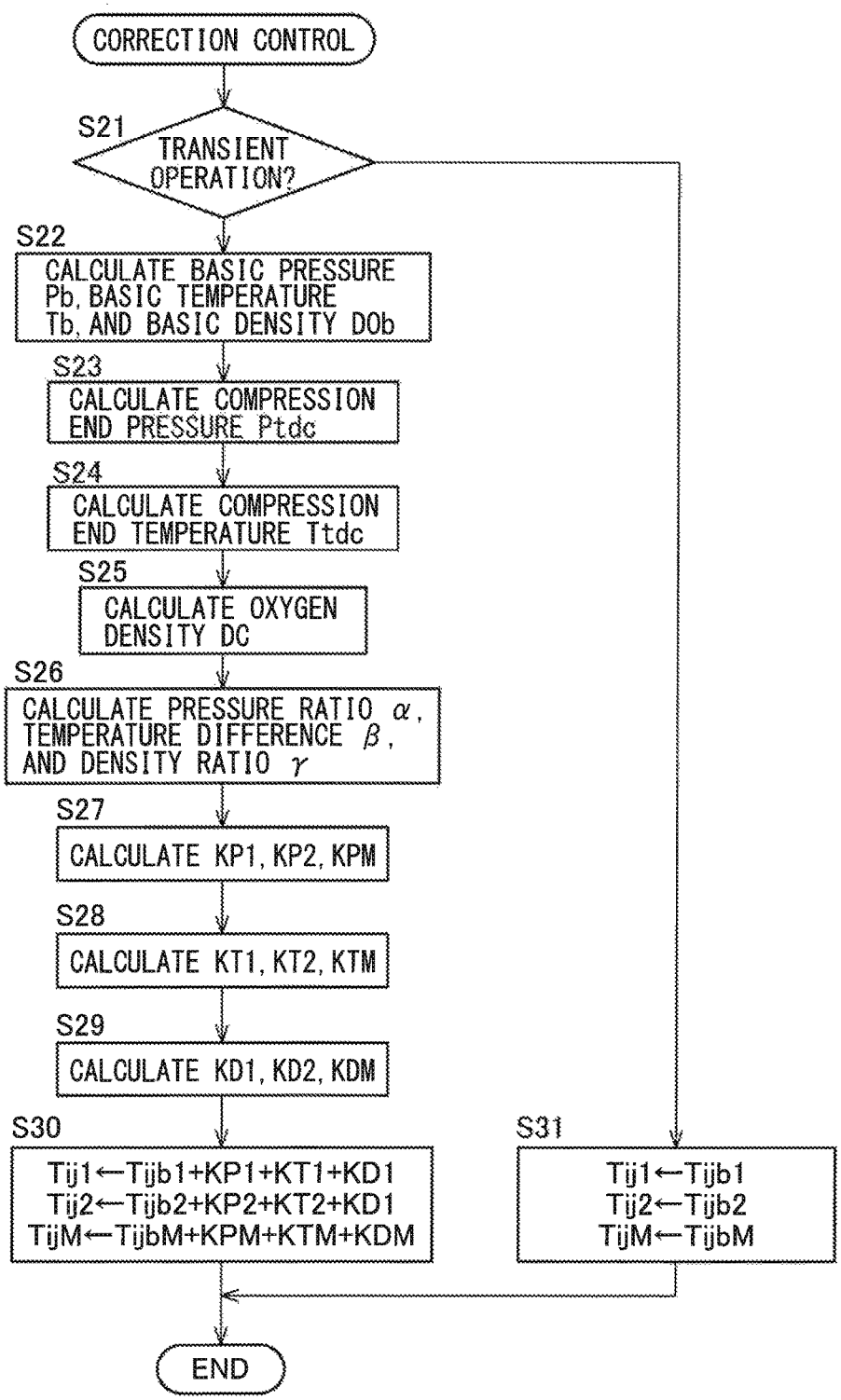
FIG. 18 is a flow chart showing control for correction of a basic injection timing.

FIG. 18 is a flow chart showing correction control of the basic injection timing. The illustrated control routine is performed by interruption at certain time intervals.

Referring to FIG. 18, first, at step S21, it is judged if the internal combustion engine 1 is in the middle of transient operation. Whether the internal combustion engine 1 is in the middle of transient operation is, for example, judged based on the amounts of change per unit time of the engine load and the engine speed and the amounts of change per unit time of the supercharging pressure and EGR rate. In this case, when an amount of change is a predetermined threshold value or more, it is judged that the internal combustion engine 1 is in the middle of transient operation, while when it is less than a predetermined threshold value, it is judged that the internal combustion engine 1 is not in the middle of transient operation but is in the middle of steady operation. If it is judged that the internal combustion engine 1 is in the middle of transient operation, the routine proceeds to step S22.

At step S22, the basic pressure Pb, basic temperature Tb, and basic density DOb are calculated, by using a map, etc., obtained in advance, based on the engine load L detected by the load sensor 88 and the engine speed N calculated based on the crank angle sensor 89.

Next, at step S23, the compression end pressure Ptdc is calculated by the intake pressure detection part. Next, at step S24, the compression end temperature Ttdc is calculated by the intake temperature detection part. Next, at step S25, the oxygen density DO is calculated by the oxygen density detection part.

At step S26, the pressure ratio α is calculated based on the basic pressure Pb calculated at step S22 and the compression end pressure Ptdc calculated at step S23. Further, the temperature difference β is calculated based on the basic temperature Tb calculated at step S22 and the compression end temperature Ttdc calculated at step S24. In addition, the density ratio γ is calculated based on the basic density DOb calculated at step S22 and the oxygen density DO calculated at step S25.

Next, at step 327, the amount of correction KP1 of the injection timing of the first pre-injection IJ1, the amount of correction KP2 of the injection timing of the second pre-injection IJ1, and the amount of correction KPM of the injection timing of the main injection IJM are calculated, by using a map such as shown in FIG. 14, based on the basic injection timings Tijb1, Tijb2, and. TijbM calculated at step S14 of FIG. 17 and the pressure ratio α calculated at step S26.

Next, at step S28, the correction amount KT1 of the injection timing of the first pre-injection IJ1, the correction amount KT2 of the injection timing of the second pre-injection IJ1, and the correction amount KTM of the injection timing of the main injection IJM are calculated, by using a map such as shown in FIG. 15, based on the basic injection timings Tijb1, Tijb2, and TijbM calculated at step S14 of FIG. 17 and the temperature difference β calculated at step S26.

Next, at step S29, the correction amount KD1 of the injection timing of the first pre-injection IJ1, the correction amount KD2 of the injection timing of the second pre-injection IJ1, and the correction amount KDM of the injection timing of the main injection IJM are calculated, by using a map such as shown in FIG. 16, based on the basic injection timings Tijb1, Tijb2, and TijbM calculated at step S14 of FIG. 17 and the density ratio γ calculated at step S26.

Next, at step S30, the following equations (5) to (7) are used to calculate the injection timing Tij1 of the first pre-injection IJ1, the injection timing Tij2 of the second pre-injection IJ1, and the injection timing TijM of the main injection IJM based on the basic injection timings Tijb1, Tij2b, and TijbM calculated at step S14 of FIG. 17 and the amount of correction calculated at steps S27 to S29, then the control routine is ended.

$$Tij1 = Tijb1 + KP1 + KT1 + KD1 \quad (5)$$

$$Tij2 = Tijb2 + KP2 + KT2 + KD2 \quad (6)$$

$$TijM = TijbM + KPM + KTM + KDM \quad (7)$$

On the other hand, when at step S21 it is judged that the internal combustion engine 1 is not in the middle of transient operation, the routine proceeds to step S31. At step S31, the basic injection timings Tijb1, Tijb2, and TijbM calculated at step S14 of FIG. 17 are respectively made the injection timing Tij1 of the first pre-injection IJ1, the injection timing Tij2 of the second pre-injection IJ1, and the injection timing TijM of the main injection IJM, then the control routine is ended. From the fuel injectors 31, fuel is injected based on the injection timings Tij1, Tij2, and TijM calculated in this way.

<Second Embodiment>

Figure 19:
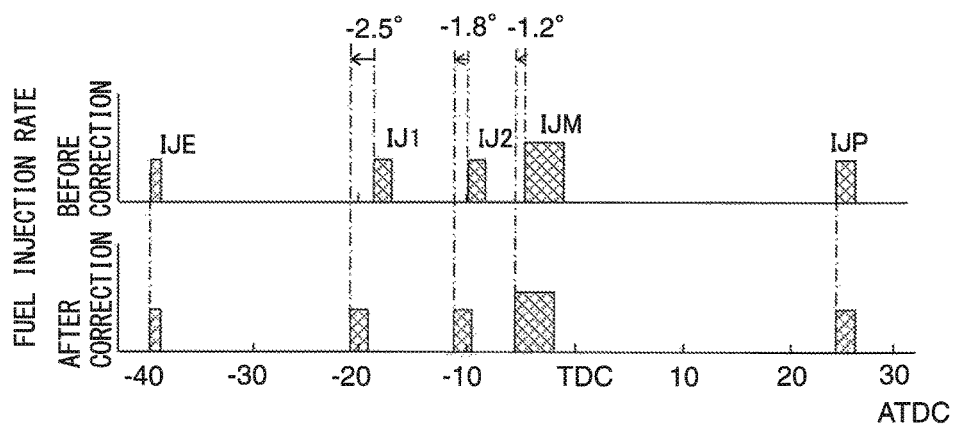
FIG. 19 is a view showing trends, with respect to crank angle, of fuel injection rates from a fuel injector before and after correction by correction control.

Next, referring to FIG. 19, a control device according to a second embodiment will be explained. FIG. 19 is a view showing the trend, with respect to crank angle, of the fuel injection rates from the fuel injectors 31 before and after correction by correction control of the present embodiment. The configuration and control of the control device according to the second embodiment are basically similar to the configuration and control of the control device according to the first embodiment. Therefore, below, only parts different from the first embodiment will be explained.

In the control device according to the first embodiment, the three fuel injections of the first pre-injection IJ1, the second pre-injection. IJ2 and main injection IJM are performed. Further, these injections are performed so that the premixed gas formed by the injections starts to burn by compression self-ignition in stages.

However, in addition to such injections, it may also be considered to perform early injection injecting a small amount of fuel at an extremely advanced side (for example, −40° ATDC). In such early injection, if increasing the injection amount, the injected fuel sticks to the wall surfaces of the combustion chambers 15, and therefore it is only possible to inject a small amount of fuel.

However, even in such early injection, the reaction speed (1/τ) is low right after fuel injection. Further, the reaction speed becomes faster the higher the fuel density of the premixed gas, but in early injection, the amount of fuel injection is small, and therefore the reaction speed is slow. As a result, by suitably controlling the injection timing and injection amount, etc., for the fuel injected by early injection as well, it is possible to control the self-ignition timing to after the start of injection of the main injection. Therefore, in the present embodiment, the injection. control part performs early injection IJE injecting fuel at an injection timing at the advanced side from −20° ATDC, in addition to the above-mentioned pre-injections and main injection.

In this regard, based on experiments it was determined that the self-ignition timing of fuel injected at the extremely advanced side like early injection, does not greatly change even if changing the injection timing. For example, in an internal combustion engine in which PCCI combustion is performed by a compression ratio of 14 to 16 or so, such a trend becomes remarkable for fuel injected at an injection timing at the advanced side from −20° ATDC.

Therefore, in the present embodiment, as shown in FIG. 19, when performing early injection IJE in addition to pre-injections and main injection. IJM, the injection timing of early injection IJE is prevented from being changed if performing correction control while the internal combustion engine is in the middle of transient operation.

In this regard, if further advancing the injection timing of early injection IJE, the injected fuel easily sticks to the wall surfaces of the cylinders 11 and as a result oil dilution occurs. Further, if such oil dilution occurs, the amount of heat generated due to combustion of the air-fuel mixture formed by the early injection IJE falls by that amount. Such a drop in the amount of heat generated invites deterioration of combustion of the air-fuel mixture formed by the main injection IJM and as a result invites an increase in unburned fuel exhausted from the combustion chambers 15. As opposed to this, in the present embodiment, the injection timing of early injection IJE is not changed, and therefore oil dilution can be suppressed and a drop in the amount of heat generated and deterioration of the exhaust emissions can be suppressed.

Note that, the injection timing of early injection IJE does not necessarily have to be the same before and after correction by correction control. Therefore, for example, the amount of correction of the injection timing of early injection IJE may be a smaller amount than any or all of the amount of correction of the injection timing of the first pre-injection. IJ1, the amount of correction of the injection timing of the second pre-injection IJ2, and the amount of correction of the injection timing of the main injection IJM.

Further, in addition to the three fuel injections of the first pre-injection IJ1, the second pre-injection IJ2, and the main injection IJM, it may be considered to perform post injection injecting a small amount of fuel after sufficient heat is generated by burning the air-fuel mixture formed by the main fuel injection IJM. Such post injection is, for example, used for making the temperature of the exhaust gas discharged from the combustion chambers 15 rise.

In this regard, the fuel injected by post injection burns right after being injected and there is almost no ignition delay time since the insides of the combustion chambers 15 are a high temperature. For this reason, there is no need to change the injection timing before and after correction by the correction control.

Therefore, in the present embodiment, as shown in FIG. 19, when performing post injection IJP in addition to pre-injections and main injection IJM, if the internal combustion engine is in the middle of transient operation, the post injection IJP is prevented from being changed if performing correction control.

Note that, the injection timing of the post injection IJP does not necessary have to be the same before and after correction by the correction control. Therefore, for example, the amount of correction of the injection timing of the post injection IJP may be an amount smaller than any or all of the amount of correction of the injection timing of the first pre-injection IJ1, the amount correction of the injection timing of the second pre-injection IJ2, and the amount of correction of the injection timing of the main injection IJM.

REFERENCE SIGNS LIST 1. internal combustion engine
10. engine body
15. combustion chamber
31. fuel injector
70. control device
71. electronic control unit (ECU)

The invention claimed is:

1. A control device of an internal combustion engine for controlling the internal combustion engine, wherein the internal combustion engine comprises a fuel injector directly injecting fuel into a combustion chamber, the control device comprising an injection control part controlling fuel injection from the fuel injector, wherein the injection control part is configured to control fuel injection from the fuel injector so that the fuel injector performs pre-injection a plurality of times, then performs main injection and so that after starting the main injection, at least part of a premixed gas formed by the pre-injections burns by compression self-ignition, the injection control part is configured to control the fuel injector so as to perform the pre-injections and the main injection at injection timings calculated based on engine load and engine speed when the internal combustion engine is operated in a steady operation mode in which the engine load and engine speed are maintained at substantially constant amounts and amounts of change per unit time of supercharging pressure and exhaust gas recirculation (EGR) rate are less than or equal to respective predetermined values, and when the internal combustion engine is operated in a transient operation mode in which the engine load and the engine speed are changing and the amounts of change per unit time of the supercharging pressure and the EGR rate are greater than the respective predetermined values, the injection control part is configured to perform correction control correcting injection timings of the main injection and the pre-injections from the injection timings calculated based on the engine load and the engine speed with respect to a time when the internal combustion engine is in the steady operation mode, and, in the correction control, the injection timings of the main injection and the pre-injections are corrected by relatively larger amounts at relatively larger crank angles from TDC before correction than at relatively smaller crank angles from TDC before correction.

2. The control device of an internal combustion engine according to claim 1, further comprising an intake pressure detection part detecting or estimating a pressure of intake gas in the combustion chamber, wherein the injection control part is configured, in the correction control, to correct the injection timings of the main injection and the pre-injections so that the injection timings of the main injection and the pre-injections are retarded relatively more at relatively higher pressures of intake gas detected or estimated by the intake pressure detection part than at relatively lower pressures of the intake gas.

3. The control device of an internal combustion engine according to claim 1, further comprising an intake temperature detection part detecting or estimating a temperature of intake gas in the combustion chamber, wherein the injection control part is configured, in the correction control, to correct the injection timings of the main injection and the pre-injections so that the injection timings of the main injection and the pre-injections are retarded relatively more at relatively higher temperatures of the intake gas detected or estimated by the intake temperature detection part than at relatively lower temperatures of the intake gas.

4. The control device of an internal combustion engine according to claim 2, further comprising an intake temperature detection part detecting or estimating a temperature of intake gas in the combustion chamber,
wherein the injection control part is configured, in the correction control, to correct the injection timings of the main injection and the pre-injections so that the injection timings of the main injection and the pre-injections are retarded relatively more at relatively higher temperatures of the intake gas detected or estimated by the intake temperature detection part than at relatively lower temperatures of the intake gas.

5. The control device of an internal combustion engine according to claim 1, further comprising an oxygen density detection part for detecting or estimating an oxygen density of intake gas in the combustion chamber,
wherein the injection control part is configured to correct the injection timings of the main injection and the pre-injections so that the injection timings of the main injection and the pre-injections are retarded relatively more at relatively higher oxygen density of the intake gas detected or estimated by the oxygen density detection part than at relatively lower oxygen density of the intake gas.

6. The control device of an internal combustion engine according to claim 2, further comprising an oxygen density detection part for detecting or estimating an oxygen density of intake gas in the combustion chamber,
wherein the injection control part is configured to correct the injection timings of the main injection and the pre-injections so that the injection timings of the main injection and the pre-injections are retarded relatively more at relatively higher oxygen density of the intake gas detected or estimated by the oxygen density detection part than at relatively lower oxygen density of the intake gas.

7. The control device of an internal combustion engine according to claim 3, further comprising an oxygen density detection part for detecting or estimating an oxygen density of intake gas in the combustion chamber,
wherein the injection control part is configured to correct the injection timings of the main injection and the pre-injections so that the injection timings of the main injection and the pre-injections are retarded relatively more at relatively higher oxygen density of the intake gas detected or estimated by the oxygen density detection part than at relatively lower oxygen density of the intake gas.

8. The control device of an internal combustion engine according to claim 4, further comprising an oxygen density detection part for detecting or estimating an oxygen density of intake gas in the combustion chamber,
wherein the injection control part is configured to correct the injection timings of the main injection and the pre-injections so that the injection timings of the main injection and the pre-injections are retarded relatively more at relatively higher oxygen density of the intake gas detected or estimated by the oxygen density detection part than at relatively lower oxygen density of the intake gas.

* * * * *